US012555518B2

(12) United States Patent
Zhang et al.

(10) Patent No.: US 12,555,518 B2
(45) Date of Patent: Feb. 17, 2026

(54) DISPLAY PANEL AND DISPLAY DEVICE

(71) Applicant: Xiamen Tianma Display Technology Co., Ltd., Xiamen (CN)

(72) Inventors: Yuheng Zhang, Xiamen (CN); Guoxing Chen, Xiamen (CN); Jiemiao Pan, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/759,760

(22) Filed: Jun. 28, 2024

(65) Prior Publication Data

US 2024/0355275 A1 Oct. 24, 2024

(30) Foreign Application Priority Data

Jun. 30, 2023 (CN) ......................... 202310796957.0

(51) Int. Cl.
*G09G 3/32* (2016.01)

(52) U.S. Cl.
CPC ........... *G09G 3/32* (2013.01); *G09G 2310/08* (2013.01); *G09G 2320/0247* (2013.01)

(58) Field of Classification Search
CPC ......... G09G 3/3233; G09G 2300/0819; G09G 2300/0861; G09G 2300/0842; G09G 2320/0233; G09G 2320/045; G09G 3/3266; G09G 2310/08; G09G 2300/0426; G09G 2320/043; G09G 3/3258; G09G 3/3291; G09G 2310/0251; G09G 2310/0262; G09G 3/3225; G09G 2320/0295
See application file for complete search history.

(56) References Cited

U.S. PATENT DOCUMENTS

2019/0206329 A1* 7/2019 Lee ...................... G09G 3/3677
2021/0104196 A1* 4/2021 Yuan .................... G09G 3/3258
2021/0375192 A1* 12/2021 Jeon ..................... G09G 3/3233
2022/0366841 A1* 11/2022 Chen ........................ G09G 5/10

FOREIGN PATENT DOCUMENTS

CN 112116897 A 12/2020
CN 113571000 A 10/2021
CN 115273737 A 11/2022
CN 115311984 A 11/2022

* cited by examiner

*Primary Examiner* — Sujit Shah
(74) *Attorney, Agent, or Firm* — KDW FIRM PLLC

(57) ABSTRACT

Provided are a display panel including a pixel circuit and a light-emitting element. The pixel circuit includes a drive module, a light emission control module, and a compensation module. The drive module includes a drive transistor. The light emission control module includes a first light emission control module and a second light emission control module, where the first light emission control module is connected between a first power signal line and the drive transistor, and the second light emission control module is connected between the drive transistor and the light-emitting element. The compensation module is connected between the gate and the second electrode of the drive transistor, and a time period during which the compensation module is on is a preset stage. In a light emission stage, the light emission control module is on; and in a non-light-emission stage, at least the second light emission control module is off.

20 Claims, 15 Drawing Sheets

31

DISPLAY PANEL AND DISPLAY DEVICE

CROSS-REFERENCE TO RELATED APPLICATION(S)

This application claims priority to Chinese Patent Application No. 202310796957.0 filed Jun. 30, 2023, the disclosure of which is incorporated herein by reference in its entirety.

TECHNICAL FIELD

The present application belongs to the field of display technology and, in particular, to a display panel and a display device.

BACKGROUND

With the continuous development of display technology, people have increasingly higher requirements for the performance of a display panel.

However, through research, the inventor of the present application found that when the display panel displays at a lower grayscale, the display screen flickers to different degrees, further affecting the display effect of the display panel.

SUMMARY

Embodiments of the present application provide a display panel and a display device so that improvements on the problem of the flicker of the display panel can be achieved.

In the first aspect, an embodiment of the present application provides a display panel. The display panel includes a pixel circuit and a light-emitting element. The pixel circuit includes a drive module, a light emission control module, and a compensation module. The drive module includes a drive transistor, where the drive transistor includes a gate, a first electrode, and a second electrode. The light emission control module includes a first light emission control module and a second light emission control module, where the first light emission control module is connected between a first power signal line and the drive transistor, and the second light emission control module is connected between the drive transistor and the light-emitting element. The compensation module is connected between the gate and the second electrode of the drive transistor, and a time period during which the compensation module is on is a preset stage. A working process of the pixel circuit includes a non-light-emission stage and a light emission stage. In the light emission stage, the first light emission control module and the second light emission control module are on; and in the non-light-emission stage, at least the second light emission control module is off. Wherein the display panel satisfies at least one of: in the non-light-emission stage, the duration of a time period between the turn-off of the second light emission control module and the start of a first preset stage is L1, and the duration of the first preset stage is W1, where L1>W1; or, in the non-light-emission stage, a duration of a time period between an end of a last preset stage of the at least one preset stage and turn-on of the second light emission control module is Ln, and a duration of the last preset stage is Wn, wherein Ln>Wn.

In the second aspect, an embodiment of the present application provides a display device including the display panel provided in the first aspect.

BRIEF DESCRIPTION OF DRAWINGS

To illustrate technical solutions in embodiments of the present application more clearly, the drawings used in the description of the embodiments are briefly described below. Those skilled in the art may obtain other drawings based on the drawings described below on the premise that no creative work is done.

DETAILED DESCRIPTION

Figure 1:
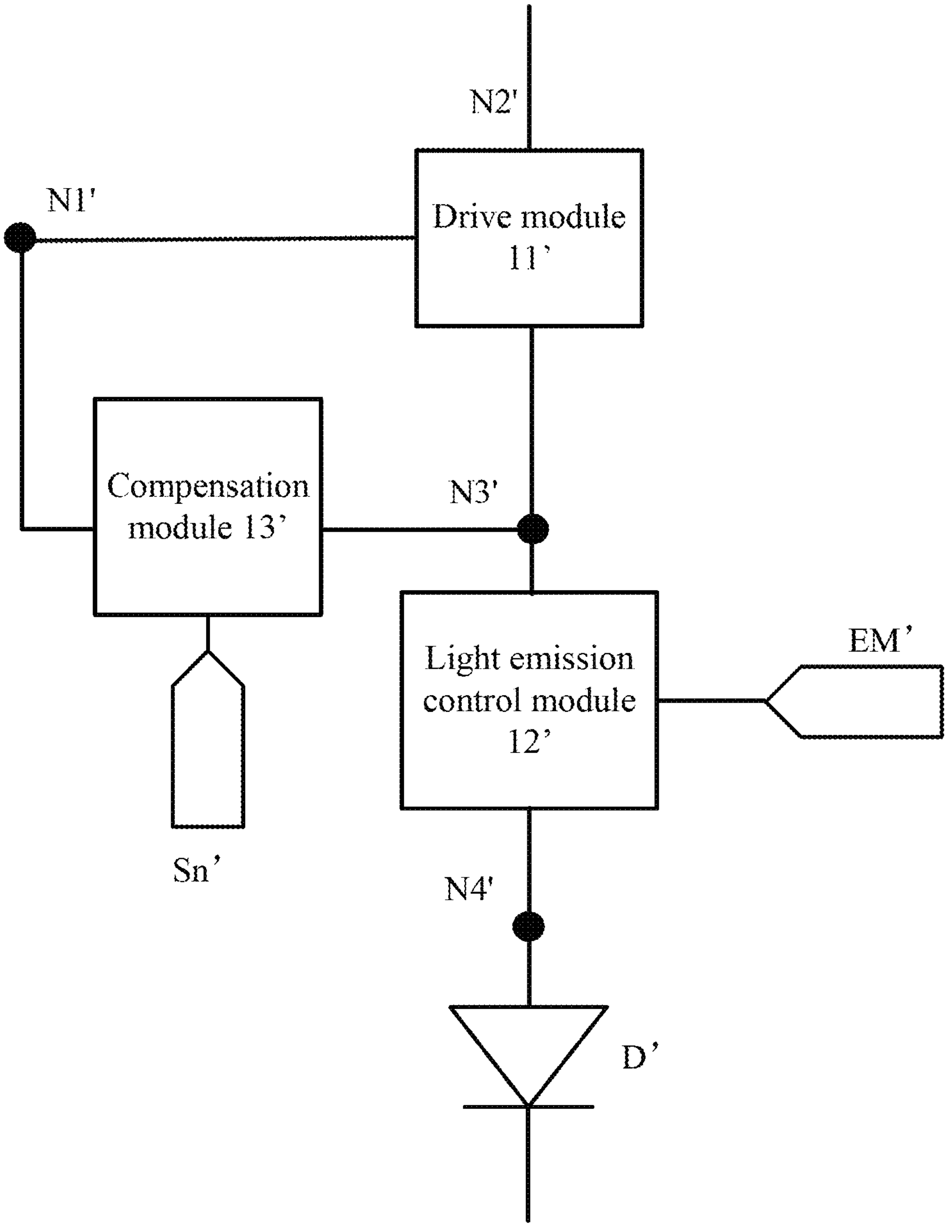
FIG. 1 (Prior art)
FIG. 1 is a schematic diagram of a pixel circuit.

Features and example embodiments in various aspects of the present application are described hereinafter in detail. To provide a clearer understanding of the objects, technical solutions, and advantages of the present application, the present application is further described in detail in conjunction with drawings and embodiments. It is to be understood that the embodiments set forth below are intended to illustrate and not to limit the present application. To those skilled in the art, the present application may be implemented with no need for some of these specific details. The description of the embodiments hereinafter is intended only to provide a better understanding of the present application through examples of the present application.

It is to be noted that in this article, relationship terms such as a first and a second are used merely to distinguish one entity or operation from another. It does not necessarily require or imply any such actual relationship or order between these entities or operations. Furthermore, the term "comprising", "including" or any other variant thereof is intended to encompass a non-exclusive inclusion so that a process, method, article, or device that includes a series of elements not only includes the expressly listed elements but may also include other elements that are not expressly listed or are inherent to such process, method, article, or device. In the absence of more restrictions, the elements defined by the statement "including . . . " do not exclude the presence of additional identical elements in the process, method, article, or device that includes the elements.

It is to be understood that the term "and/or" used herein merely describes the association relationships between associated objects and indicates that three relationships may exist. For example, A and/or B may indicate three cases: A exists alone, A and B both exist, and B exists alone. In addition, the character "/" herein generally indicates that the front and rear associated objects are in an "or" relationship.

It is to be noted that the transistor in the embodiments of the present application may be an N-type transistor or a P-type transistor. For the N-type transistor, the on level is a high level, and the off level is a low level. That is, when the gate of the N-type transistor is at a high level, the first electrode and the second electrode are turned on; and when the gate of the N-type transistor is at a low level, the first electrode and the second electrode are turned off. For the P-type transistor, the on level is a low level, and the off level is a high level. That is, when the control electrode of the P-type transistor is at a low level, the first electrode and the second electrode are turned on; and when the control terminal of the P-type transistor is at a high level, the first electrode and the second electrode are turned off. During specific implementation, the gate of each of the preceding transistors is used as the control electrode; moreover, according to the signal and type of the gate of each transistor, the first electrode may be used as the source and the second electrode may be used as the drain, or the first electrode may be used as the drain and the second electrode may be used as the source, and no distinction is made here. In addition, in the embodiments of the present disclosure, the on level refers to any level that can make the transistor turned on, and the off level refers to any level that can make the transistor cut off/turned off.

In the embodiments of the present application, the term "electrically connected" may refer to a direct electrical connection between two assemblies or may refer to an electrical connection between two assemblies via one or more other assemblies.

In the embodiments of the present application, the first node, the second node, the third node, and the fourth node are defined merely for the convenience of describing the circuit structure, and the first node, the second node, the third node, and the fourth node are not actual circuit units.

It is apparent for those skilled in the art that various modifications and changes in the present application may be made without departing from the spirit or scope of the present application. Therefore, the present application is intended to cover modifications and variations of the present application that fall within the scope of the corresponding claims (the claimed technical solutions) and their equivalents. It is to be noted that the embodiments of the present application may be combined with each other if there is no contradiction.

Before the technical solutions provided in the embodiments of the present application are explained, to facilitate the understanding of the embodiments of the present application, the present application first specifically explains the problems existing in the related art.

FIG. 1 is a schematic diagram of a pixel circuit. As shown in FIG. 1, the pixel circuit may include a drive module 11', a light emission control module 12', and a compensation module 13'. A control terminal of the drive module 11' may be electrically connected to a first node N1', a first terminal of the drive module 11' may be electrically connected to a second node N2', the second node N2' may be used for receiving a first power supply voltage signal, and a second terminal of the drive module 11' may be electrically connected to a third node N3'. A control terminal of the light emission control module 12' may be electrically connected to a light emission control signal line EM', a first terminal of the light emission control module 12' is electrically connected to the third node N3', and a second terminal of the light emission control module 12' is electrically connected to a first electrode of a light-emitting element D'. The light emission control module 12' is used for controlling the light-emitting element D' to emit light. For example, when the light emission control module 12' is turned on, the output current provided by the pixel circuit is transmitted to the first electrode of the light-emitting element D', and the light-emitting element D' emits light. A control terminal of the compensation module 13' is electrically connected to a scan signal line Sn', a first terminal of the compensation module 13' is electrically connected to the first node N1', and a second terminal of the compensation module 13' is electrically connected to the third node N3'. The compensation module 13' is used for achieving the compensation of the threshold voltage of the drive module 11'.

Figure 2:
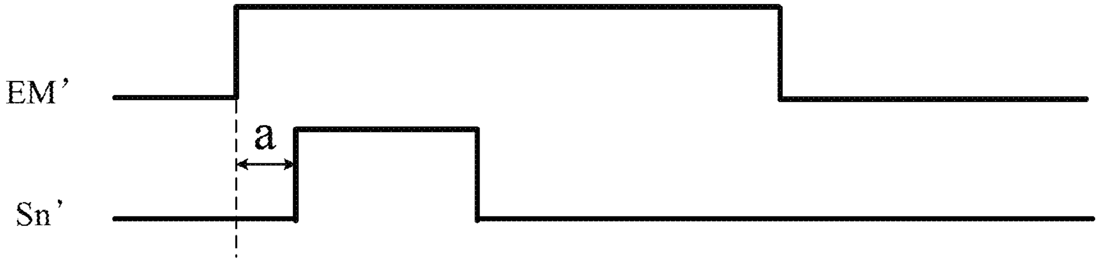
FIG. 2 (Prior art)
FIG. 2 is a drive timing diagram of a pixel circuit.

FIG. 2 is a drive timing diagram of a pixel circuit. In conjunction with FIGS. 1 and 2, the case where the on level of a light emission control signal provided by the light emission control signal line EM' is a low level and the on level of a scan signal provided by the scan signal line Sn' is a high level is used as an example. When the light emission control signal is at the on level (the low level as shown in FIG. 2), the drive current of the pixel circuit is transmitted to a fourth node N4', the potential of the fourth node N4' is pulled up, and the light-emitting element D' emits light.

Through research, the inventor of the present application found that after the light emission control signal switches from the on level to the off level (the high level as shown in FIG. 2), the discharge of the fourth node N4' takes a time period. When a time interval a between the end moment of the on level of the light emission control signal and the start moment of the on level of the scan signal is relatively small, the fourth node N4' is not completely discharged, and the fourth node N4' is still at a relatively high potential. When the scan signal switches from a low level to a high level, the potential of the fourth node N4' is pulled up again by the parasitic capacitance between the scan signal line Sn' and the fourth node N4' and/or the parasitic capacitance of the light emission control module 12'. Since the fourth node N4' is not completely discharged, after the potential of the fourth node N4' is pulled up again, it is easy to cause the light-emitting element D' to emit light again, causing the flicker. Moreover, this flicker phenomenon is especially noticeable at a relatively low refresh rate and a relatively low grayscale.

In view of the preceding research findings of the inventor, the embodiments of the present application provide a display panel and a display device, so as to solve the technical problem of the flicker of the display panel in the related art.

The technical concept of the embodiments of the present application lies in that the time interval between a non-light-emission stage and a first preset stage is increased so that the potential of a node between a second light emission control module and a drive transistor and the potential of a node (that is, the first electrode of the light-emitting element) between the second light emission control module and the light-emitting element tend to be stable, and the potential of the first electrode of the light-emitting element is fully discharged to a relatively low potential. In this manner, since the potential of the first electrode of the light-emitting element is fully discharged to a relatively low potential, even if the potential of the first electrode of the light-emitting element is pulled up again under the coupling effect of the parasitic capacitance, the potential of the first electrode of the light-emitting element after being pulled up is still relatively small, and it is difficult for the light-emitting element to emit light again so that the flicker phenomenon can be better solved and the display effect of the display panel can be improved.

The display panel provided in the embodiment of the present application is first described below.

Figure 3:
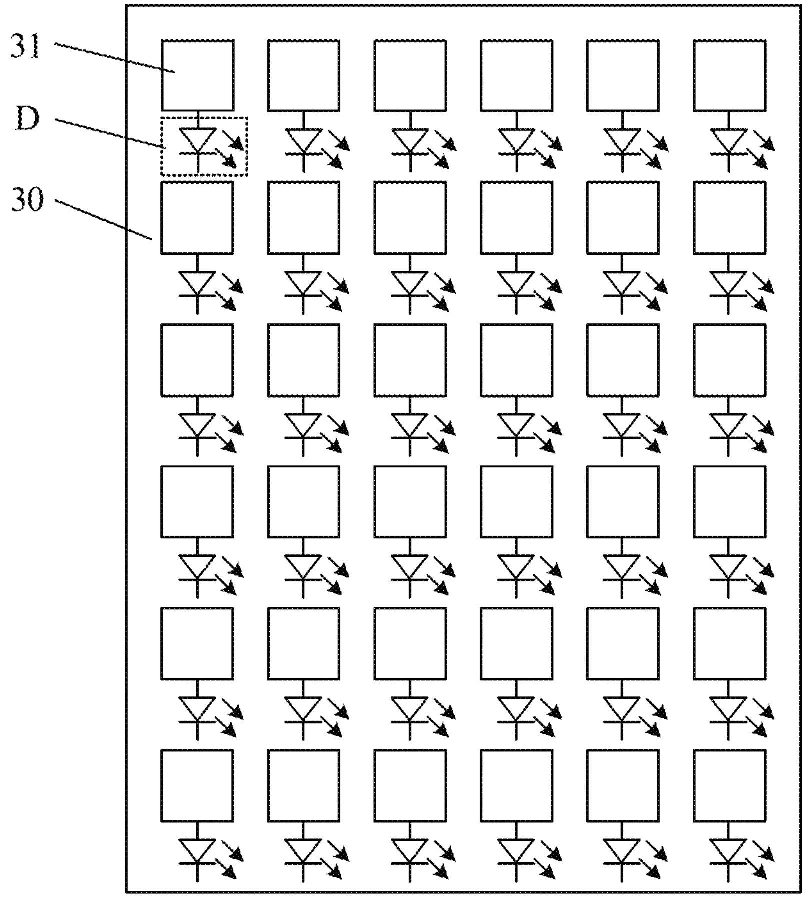
FIG. 3 is a structural diagram of a display panel according to an embodiment of the present application.

FIG. 3 is a structural diagram of a display panel according to an embodiment of the present application. As shown in FIG. 3, a display panel 30 may include pixel circuits 31 and light-emitting elements D. For example, the light-emitting element D includes, but is not limited to, an organic light-emitting diode (OLED), an inorganic light-emitting diode (LED), or a quantum dot (QD) light-emitting diode. The inorganic LED may include, for example, a mini light-emitting diode (mini LED), a micro light-emitting diode (microLED), or a quantum dot light-emitting diode (QLED), which is not limited in the embodiment of the present application.

Figure 4:
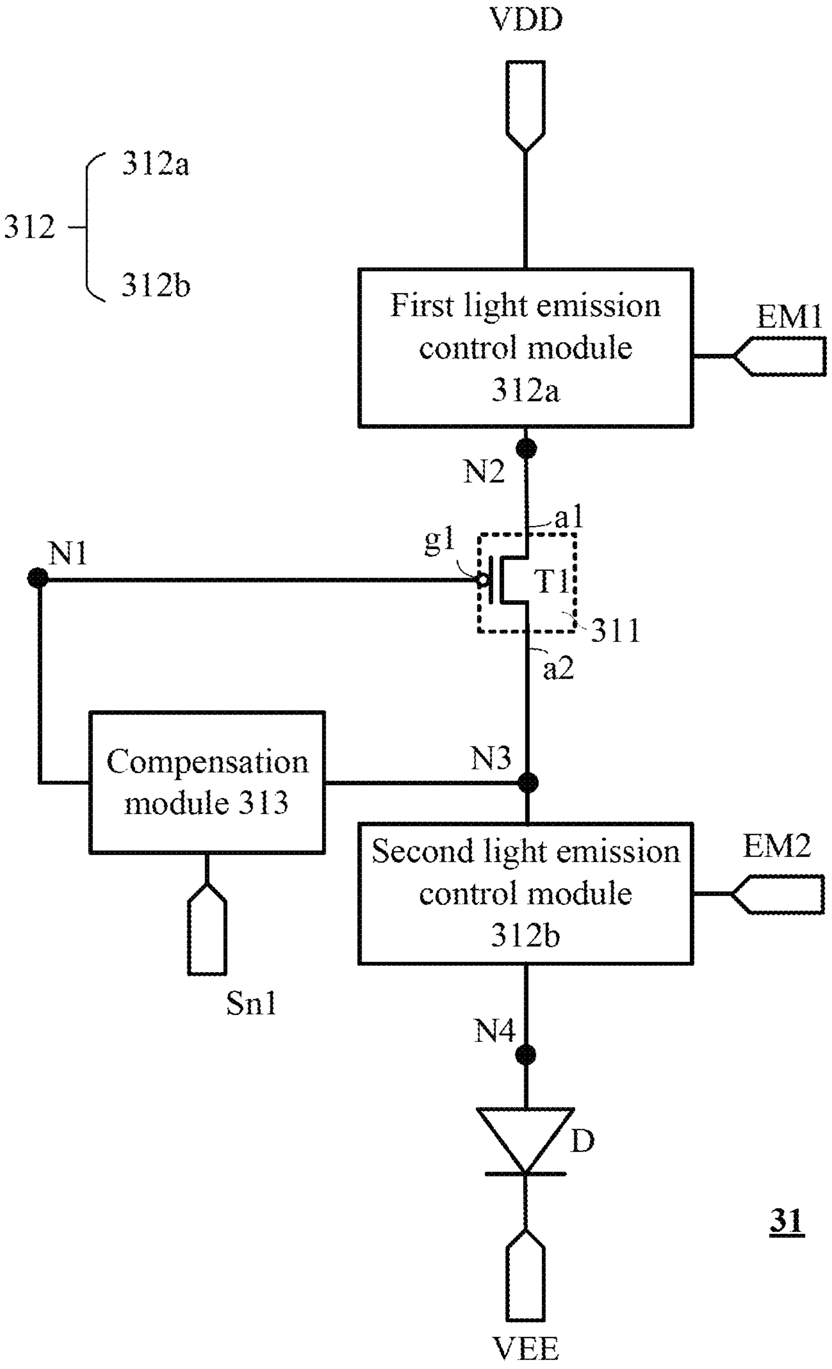
FIG. 4 is a schematic diagram of a pixel circuit of a display panel according to an embodiment of the present application.

FIG. 4 is a schematic diagram of a pixel circuit of a display panel according to an embodiment of the present application. As shown in FIG. 4, a pixel circuit 31 may include a drive module 311, a light emission control module 312, and a compensation module 313. The drive module 311 may include a drive transistor T1, and the drive transistor T1 may include a gate g1, a first electrode a1, and a second electrode a2. The gate g1 of the drive transistor T1 may be electrically connected to a first node N1, the first electrode a1 of the drive transistor T1 may be electrically connected to a second node N2, and the second electrode a2 of the drive transistor T1 may be electrically connected to a third node N3. The light emission control module 312 may include a first light emission control module 312*a* and a second light emission control module 312*b*. The first light emission control module 312*a* may be connected between a first power signal line VDD and the drive transistor T1. For example, a control terminal of the first light emission control module 312*a* may be electrically connected to a first light emission control signal line EM1, a first terminal of the first light emission control module 312*a* may be electrically connected to the first power signal line VDD, and a second terminal of the first light emission control module 312*a* may be electrically connected to the first electrode a1 of the drive transistor T1. For example, the first power signal line VDD may be used for providing a first power signal with a positive voltage value.

The second light emission control module 312*b* may be connected between the drive transistor T1 and the light-emitting element D. For example, a control terminal of the second light emission control module 312*b* may be electrically connected to a second light emission control signal line EM2, a first terminal of the second light emission control module 312*b* may be electrically connected to the second electrode a2 of the drive transistor T1, and a second terminal of the second light emission control module 312*b* may be electrically connected to the first electrode of the light-emitting element D. The second electrode of the light-emitting element D may be electrically connected to a second power signal line VEE. The first electrode of the light-emitting element D may include the anode of the light-emitting element D, and the second electrode of the light-emitting element D may include the cathode of the light-emitting element D. For example, the second power signal line VEE may be used for providing a second power signal with a negative voltage value.

It is to be noted that, in some examples, the first light emission control signal line EM1 may be reused as the second light emission control signal line EM2. In some other examples, the first light emission control signal line EM1 may not be reused as the second light emission control signal line EM2, which is not limited in the embodiment of the present application.

The compensation module 313 may be connected between the gate g1 of the drive transistor T1 and the second electrode a2 of the drive transistor T1. For example, a control terminal of the compensation module 313 may be electrically connected to a first scan signal line Sn1, a first terminal of the compensation module 313 may be electrically connected to the gate g1 of the drive transistor T1, and a second terminal of the compensation module 313 may be electrically connected to the second electrode a2 of the drive transistor T1. The compensation module 313 may be used for compensating the threshold voltage of the drive transistor T1.

Figure 5:
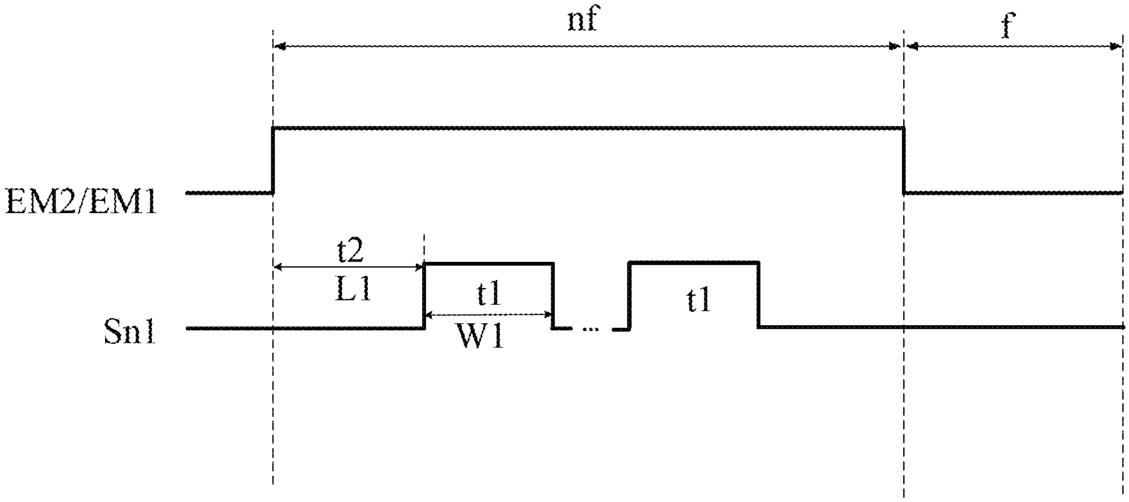
FIG. 5 is a drive timing diagram of a pixel circuit of a display panel according to an embodiment of the present application.

FIG. 5 is a drive timing diagram of a pixel circuit of a display panel according to an embodiment of the present application. In conjunction with FIGS. 4 and 5, the time period during which the compensation module 313 is on is a preset stage t1. In the preset stage t1, a first scan signal provided by the first scan signal line Sn1 may be at the on level, and the compensation module 313 is turned on in response to the on level provided by the first scan signal line Sn1. FIG. 5 shows an example in which the on level of the first scan signal is a high level. That is, the compensation module 313 may include an N-type transistor. In some specific examples, the compensation module 313 may include a low-temperature polycrystalline oxide (LTPO) transistor so that the leakage current of the gate g1 of the drive transistor T1 is reduced and improvements on the problem of the flicker of the display panel driven at a low frequency are achieved.

The working process of the pixel circuit 31 may include a non-light-emission stage nf and a light emission stage f.

In the lighting emission stage f, the first light emission control module 312*a* and the second light emission control module 312*b* are on. In the light emission stage f, the drive current of the pixel circuit 31 is transmitted to the first electrode of the light-emitting element D, and the light-emitting element D emits light.

In the non-light-emission stage nf, at least the second light emission control module 312*b* is off. The first light emission control module 312*a* may be off or may not be off, which is not limited in the embodiment of the present application. Since at least the second light emission control module 312*b* is off, the pixel circuit 31 does not provide the drive current for the first electrode of the light-emitting element D in the non-light-emission stage, and the light-emitting element D does not emit light.

In the non-light-emission stage, the duration of a time period t2 between the turn-off of the second light emission control module 312*b* and the start of the first preset stage t1 is L1, and the duration of the first preset stage t1 is W1. The first preset stage t1 may be specifically understood as the first preset stage t1 in the next light emission cycle. That is, the duration L1 may be the duration of the time period t2 between the turn-off of the second light emission control module 312*b* and the start of the first preset stage t1 in the next light emission cycle. Alternatively, the duration L1 may also be understood as the minimum time interval between the turn-off of the second light emission control module 312*b* and the preset stage t1 in the next light emission cycle.

In the embodiment of the present application, L1>W1 so that it can be ensured that the duration of the time period t2 between the non-light-emission stage and the first preset stage is relatively long. Therefore, after the time period t2, the potential of the node (the third node N3 as shown in FIG. 4) between the second light emission control module and the drive transistor and the potential of the node (the fourth node N4 as shown in FIG. 4) between the second light emission control module and the light-emitting element tend to be stable so that the potential of the fourth node N4 (that is, the potential of the first electrode of the light-emitting element) is fully discharged to a relatively low potential. In this manner, since the potential of the first electrode of the light-emitting element is fully discharged to a relatively low potential, even if the potential of the first electrode of the light-emitting element is pulled up again under the coupling effect of the parasitic capacitance, the potential of the first electrode of the light-emitting element after being pulled up is still relatively small, and it is difficult for the light-emitting element to emit light again so that the flicker phenomenon can be better solved and the display effect of the display panel can be improved.

The inventor of the present application further realized that at the end moment of the preset stage t1, for example, the first scan signal provided by the first scan signal line Sn1 switches from a high level to a low level (that is, the potential jumps low), and then the parasitic capacitance between the first scan signal line Sn1 and the fourth node N4 and/or the parasitic capacitance of the light emission control module 12' may affect the potential of the fourth node N4.

If the duration of a time period t3 between the end moment of the preset stage t1 and the moment at which the second light emission control module 312*b* is turned on is relatively short, the potential of the fourth node N4 in the light emission stage f may be affected, further affecting the brightness of the light-emitting element, for example, making the brightness of the light-emitting element low or jump.

In view of this, the present application considers increasing the duration of the time period t3 between the end moment of the preset stage t1 and the moment at which the second light emission control module 312*b* is turned on so that the influence of the coupling effect of the parasitic capacitance on the potential of the fourth node N4 in the light emission stage f is reduced, the brightness of the light-emitting element can reach the expected brightness, and the flicker problem is solved.

Figure 6:
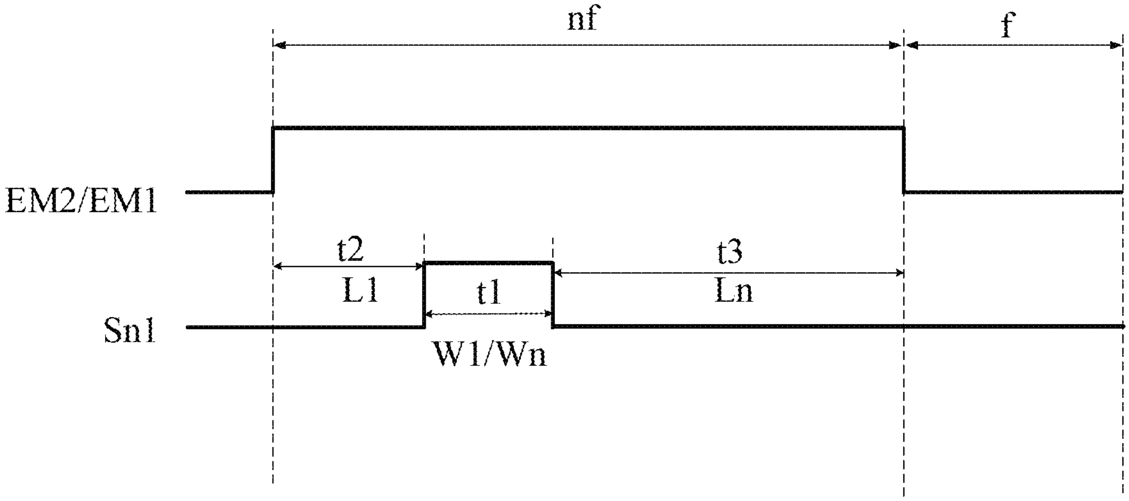
FIG. 6 is another drive timing diagram of a pixel circuit of a display panel according to an embodiment of the present application.

FIG. 6 is another drive timing diagram of a pixel circuit of a display panel according to an embodiment of the present application. In conjunction with FIGS. 4 and 6, according to some embodiments of the present application, in the non-light-emission stage nf, the duration of the time period t3 between the end of the last preset stage t1 and the turn-on of the second light emission control module 312*b* is Ln, and the duration of the last preset stage t1 is Wn. FIG. 6 shows an example in which the non-light-emission stage nf includes one preset stage t1. In other embodiments, the non-light-emission stage nf may also include multiple preset stages t1, which is not limited in the embodiment of the present application. The duration Ln may be understood as the minimum time interval between the end moment of the preset stage t1 and the moment at which the second light emission control module 312*b* is turned on. For example, when the non-light-emission stage nf includes multiple preset stages t1, the duration Ln may be the time interval between the end moment of the preset stage t1 closest to the moment at which the second light emission control module 312*b* is turned on and the moment at which the second light emission control module 312*b* is turned on.

Ln>Wn. In this manner, it can be ensured that the duration of the time period t3 between the end of the last preset stage t1 and the turn-on of the second light emission control module 312*b* is relatively long so that the influence of the coupling effect of the parasitic capacitance on the potential of the fourth node N4 in the light emission stage f is reduced, the brightness of the light-emitting element can reach the expected brightness, and the flicker problem is solved.

According to some embodiments of the present application, the non-light-emission stage may include N preset stages, where N≥1, and N is an integer.

With continued reference to FIG. 6, in some embodiments, for example, N=1, that is, the non-light-emission stage nf may include one preset stage t1. Since only one preset stage t1 exists, the first preset stage t1 and the last preset stage t1 are the same preset stage t1, and W1=Wn.

Figure 7:
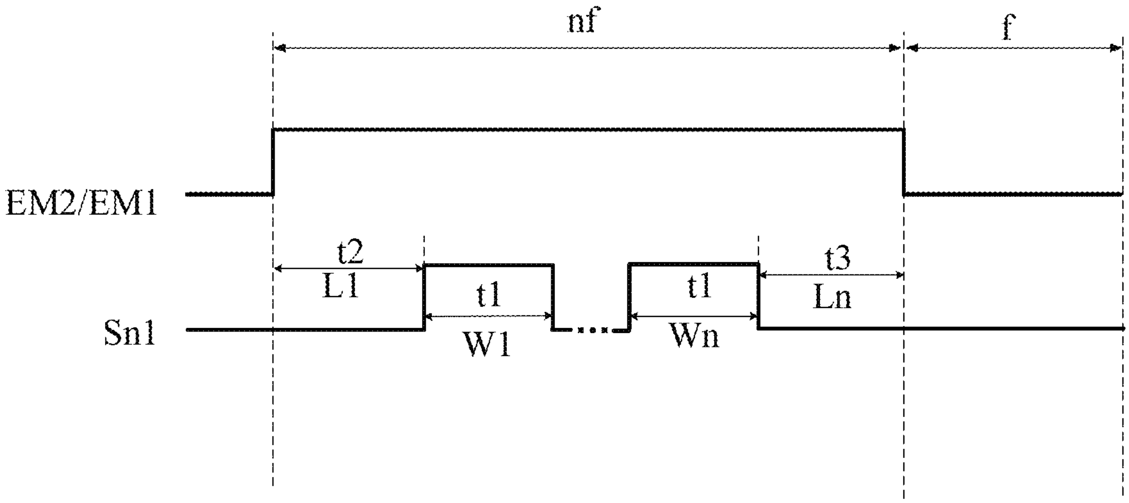
FIG. 7 is another drive timing diagram of a pixel circuit of a display panel according to an embodiment of the present application.

FIG. 7 is another drive timing diagram of a pixel circuit of a display panel according to an embodiment of the present application. As shown in FIG. 7, in some other examples, N may be greater than 1, that is, the non-light-emission stage nf may include multiple preset stages t1. When N>1, the duration W1 of the first preset stage t1 may be equal to the duration Wn of the last preset stage t1. In this manner, it is conducive to improving the uniformity of the first scan signal and reducing the complexity of the first scan signal. Of course, when N>1, the duration W1 of the first preset stage t1 may not be equal to the duration Wn of the last preset stage t1. In this manner, the flexibility of adjusting the first scan signal can be improved so as to satisfy different application situations. FIG. 7 shows an example in which W1=Wn.

Figure 8:
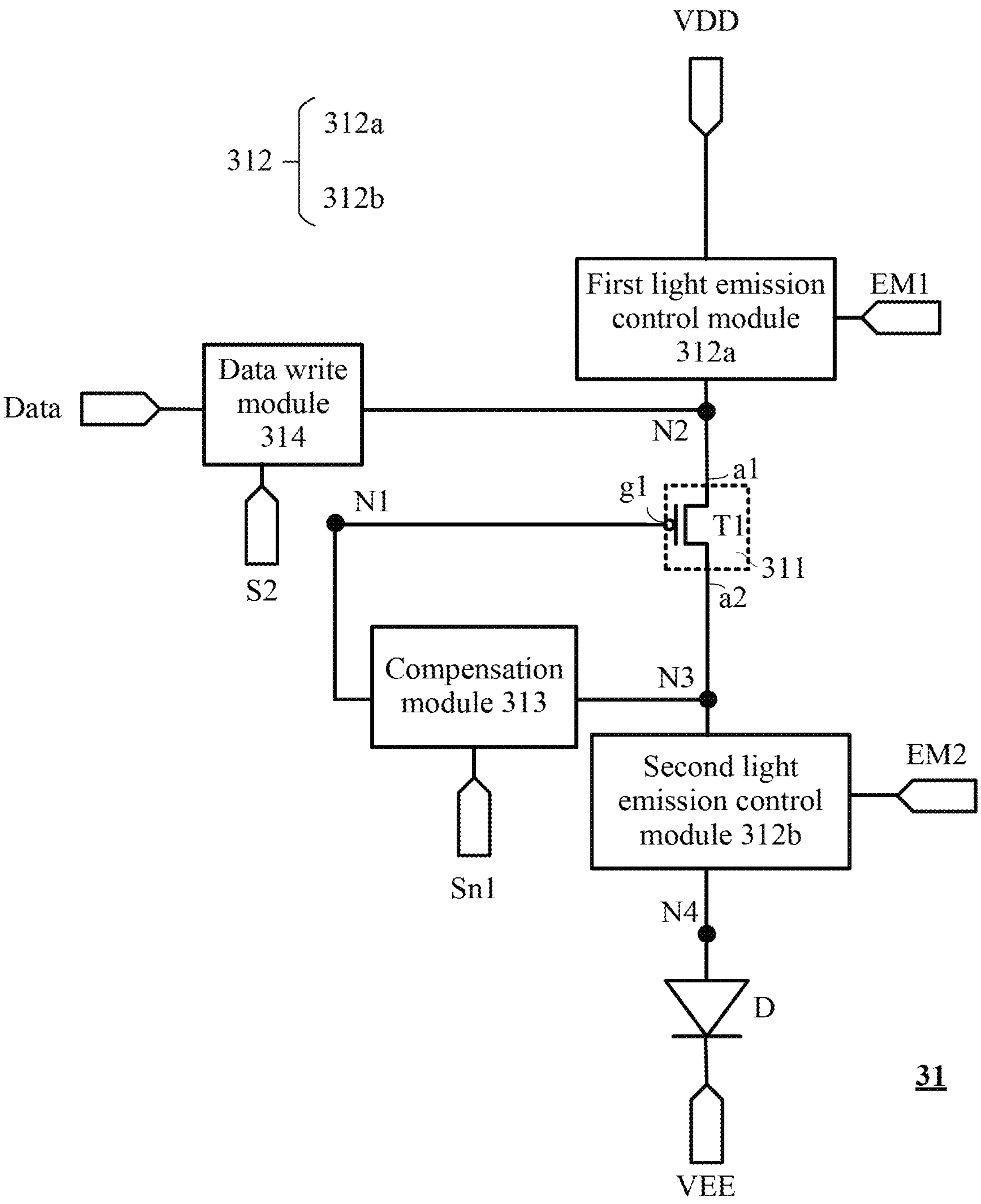
FIG. 8 is another schematic diagram of a pixel circuit of a display panel according to an embodiment of the present application.

FIG. 8 is another schematic diagram of a pixel circuit of a display panel according to an embodiment of the present application. As shown in FIG. 8, according to some embodiments of the present application, the pixel circuit 31 may further include a data write module 314, and the data write module 314 may be connected to the first electrode a1 of the drive transistor T1. For example, a control terminal of the data write module 314 is electrically connected to a second scan signal line S2, a first terminal of the data write module 314 is electrically connected to a data signal line data, and a second terminal of the data write module 314 is electrically connected to the first electrode a1 of the drive transistor T1. The data write module 314 may be controlled by the second scan signal line S2 to be turned on and is used for providing a data signal for the drive transistor T1.

Figure 9:
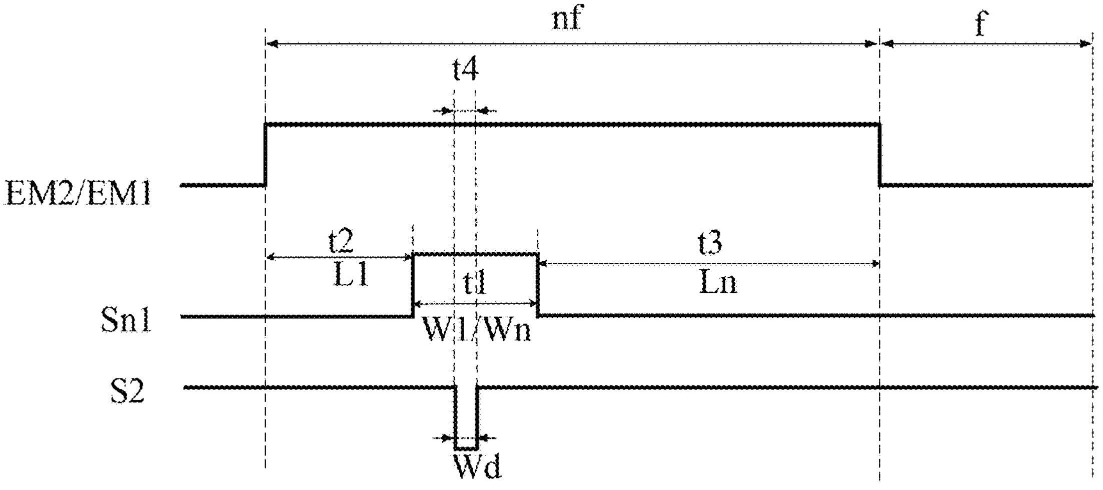
FIG. 9 is another drive timing diagram of a pixel circuit of a display panel according to an embodiment of the present application.

FIG. 9 is another drive timing diagram of a pixel circuit of a display panel according to an embodiment of the present application. As shown in FIG. 9, the working process of the pixel circuit may include a data write stage t4. FIG. 9 shows an example in which the on level of a second scan signal provided by the second scan signal line S2 is a low level. In conjunction with FIGS. 8 and 9, in the data write stage t4, the data write module 314 and the compensation module 313 are turned on, and the data write module 314 provides the data signal for the drive transistor T1. Specifically, in the data write stage t4, the data write module 314 is turned on in response to the on level (the low level as shown in FIG. 9) provided by the second scan signal line S2, the compensation module 313 is turned on in response to the on level (the high level as shown in FIG. 9) provided by the first scan signal line Sn1, and the data signal of the data signal line data is written into the gate g1 of the drive transistor T1 through the data write module 314, the drive transistor T1, and the compensation module 313 in sequence.

In this manner, in the data write stage t4, the data write module 314 and the compensation module 313 are turned on, thereby ensuring that the data signal is successfully written into the gate g1 of the drive transistor T1, so as to complete the data write.

With continued reference to FIG. 9, in some embodiments of the present application, for example, N=1, that is, the non-light-emission stage nf may include one preset stage t1. The duration of the data write stage t4 is Wd. The preset stage t1 may cover the data write stage t4, and W1=Wn>Wd. For example, in some examples, the start moment of the preset stage t1 may be earlier than the start moment of the data write stage t4, and the end moment of the preset stage t1 may be later than the end moment of the data write stage t4.

That is to say, in conjunction with FIGS. 8 and 9, before the data write module 314 is turned on, the compensation module 313 may be turned on a certain time period earlier; and before the data write module 314 is turned off, the compensation module 313 may be turned off a certain time period later. In this manner, on the one hand, since the preset stage t1 covers the data write stage t4, it can be ensured that the duration is enough for the writing of the data signal; on the other hand, the compensation module 313 is turned on a certain time period earlier and turned off a certain time period later so that it can be ensured that when the data write module 314 writes the data signal, the compensation module 313 is on stably, the accuracy of the data signal write can be ensured, and the potential of the gate g1 of the drive transistor T1 can reach the expected potential.

Figure 10:
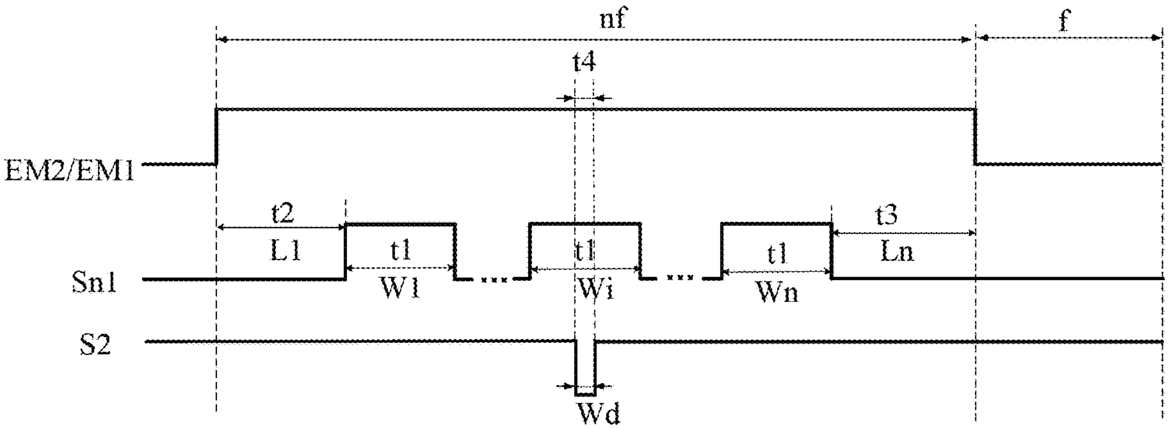
FIG. 10 is another drive timing diagram of a pixel circuit of a display panel according to an embodiment of the present application.

FIG. 10 is another drive timing diagram of a pixel circuit of a display panel according to an embodiment of the present application. As shown in FIG. 10, different from the embodiment shown in FIG. 9, according to other embodiments of the present application, N>1, that is, the non-light-emission stage nf may include multiple preset stages t1. The i-th preset stage t1 covers the data write stage t4, and Wi>Wd. Wd denotes the duration of the data write stage t4, Wi denotes the duration of the i-th preset stage t1, and 1≤i≤N. FIG. 10 shows an example in which 1<i<N. The magnitudes of i and N may be flexibly adjusted according to actual conditions, which is not limited in the embodiment of the present application.

For example, in some examples, the start moment of the i-th preset stage t1 may be earlier than the start moment of the data write stage t4, and the end moment of the i-th preset stage t1 may be later than the end moment of the data write stage t4.

That is to say, as shown in FIGS. 8 and 10, before the data write module 314 is turned on, the compensation module 313 may be turned on a certain time period earlier; and before the data write module 314 is turned off, the compensation module 313 may be turned off a certain time period later. In this manner, on the one hand, since the i-th preset stage t1 covers the data write stage t4, it can be ensured that the duration is enough for the writing of the data signal; on the other hand, the compensation module 313 is turned on a certain time period earlier and turned off a certain time period later so that it can be ensured that when the data write module 314 writes the data signal, the compensation module 313 is on stably, the accuracy of the data signal write can be ensured, and the potential of the gate g1 of the drive transistor T1 can reach the expected potential.

Figure 11:
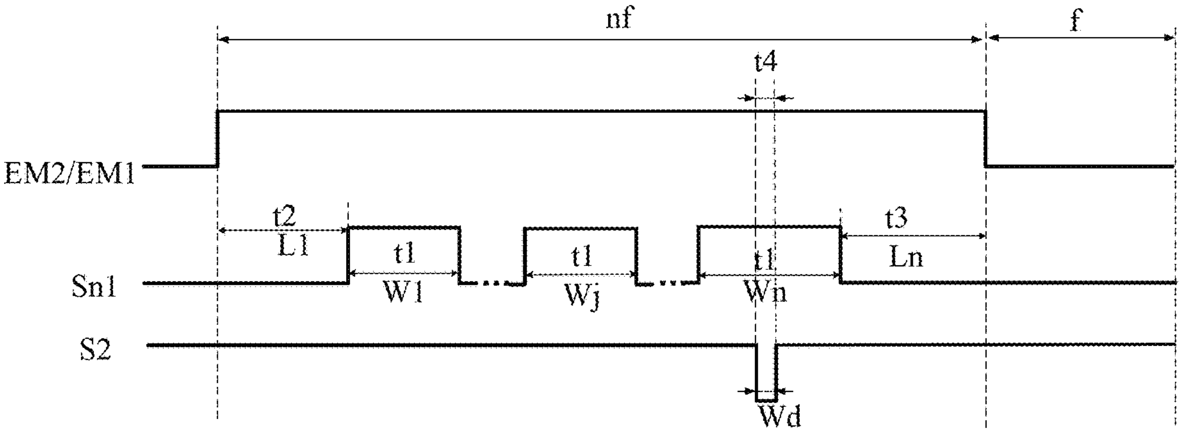
FIG. 11 is another drive timing diagram of a pixel circuit of a display panel according to an embodiment of the present application.

FIG. 11 is another drive timing diagram of a pixel circuit of a display panel according to an embodiment of the present application. As shown in FIG. 11, different from the embodiment shown in FIG. 9, according to other embodiments of the present application, N>1, that is, the non-light-emission stage nf may include multiple preset stages t1. The N-th preset stage t1 covers the data write stage t4, and Wn>Wd. That is, in the non-light-emission stage nf, the last preset stage t1 covers the data write stage t4. The magnitude of N may be flexibly adjusted according to actual conditions, which is not limited in the embodiment of the present application.

For example, in some examples, the start moment of the N-th preset stage t1 may be earlier than the start moment of the data write stage t4, and the end moment of the N-th preset stage t1 may be later than the end moment of the data write stage t4. That is to say, as shown in FIGS. 8 and 11, before the data write module 314 is turned on, the compensation module 313 may be turned on a certain time period earlier; and before the data write module 314 is turned off, the compensation module 313 may be turned off a certain time period later.

In this manner, on the one hand, since the N-th preset stage t1 covers the data write stage t4, it can be ensured that the duration is enough for the writing of the data signal; on the other hand, the compensation module 313 is turned on a certain time period earlier and turned off a certain time period later so that it can be ensured that when the data write module 314 writes the data signal, the compensation module 313 is on stably, the accuracy of the data signal write can be ensured, and the potential of the gate g1 of the drive transistor T1 can reach the expected potential.

On the other hand, since the N-th preset stage t1 covers the data write stage t4, the compensation module 313 is not turned on again before the light emission stage f so that the stability of the potential of the gate g1 of the drive transistor T1 can be ensured, thereby ensuring that the brightness of the light-emitting element can reach the expected brightness.

With continued reference to FIG. 11, according to some embodiments of the present application, when the N-th preset stage t1 covers the data write stage t4, Wn>Wj, and 1≤j≤N−1. That is, the duration Wn of the N-th preset stage t1 may be greater than the duration of any one or any number of preset stages t1 before the N-th preset stage t1.

In this manner, it is ensured that the duration Wn of the N-th preset stage t1 is relatively long so that the N-th preset stage t1 can fully cover the data write stage t4, and it is ensured that the duration is enough for the writing of the data signal. On the other hand, the compensation module 313 may be turned on a relatively long time period earlier and turned off a relatively long time period later so that it is ensured to a large extent that when the data write module 314 writes the data signal, the compensation module 313 is on stably, the accuracy of the data signal write can be ensured, and the potential of the gate g1 of the drive transistor T1 can reach the expected potential.

Figure 12:
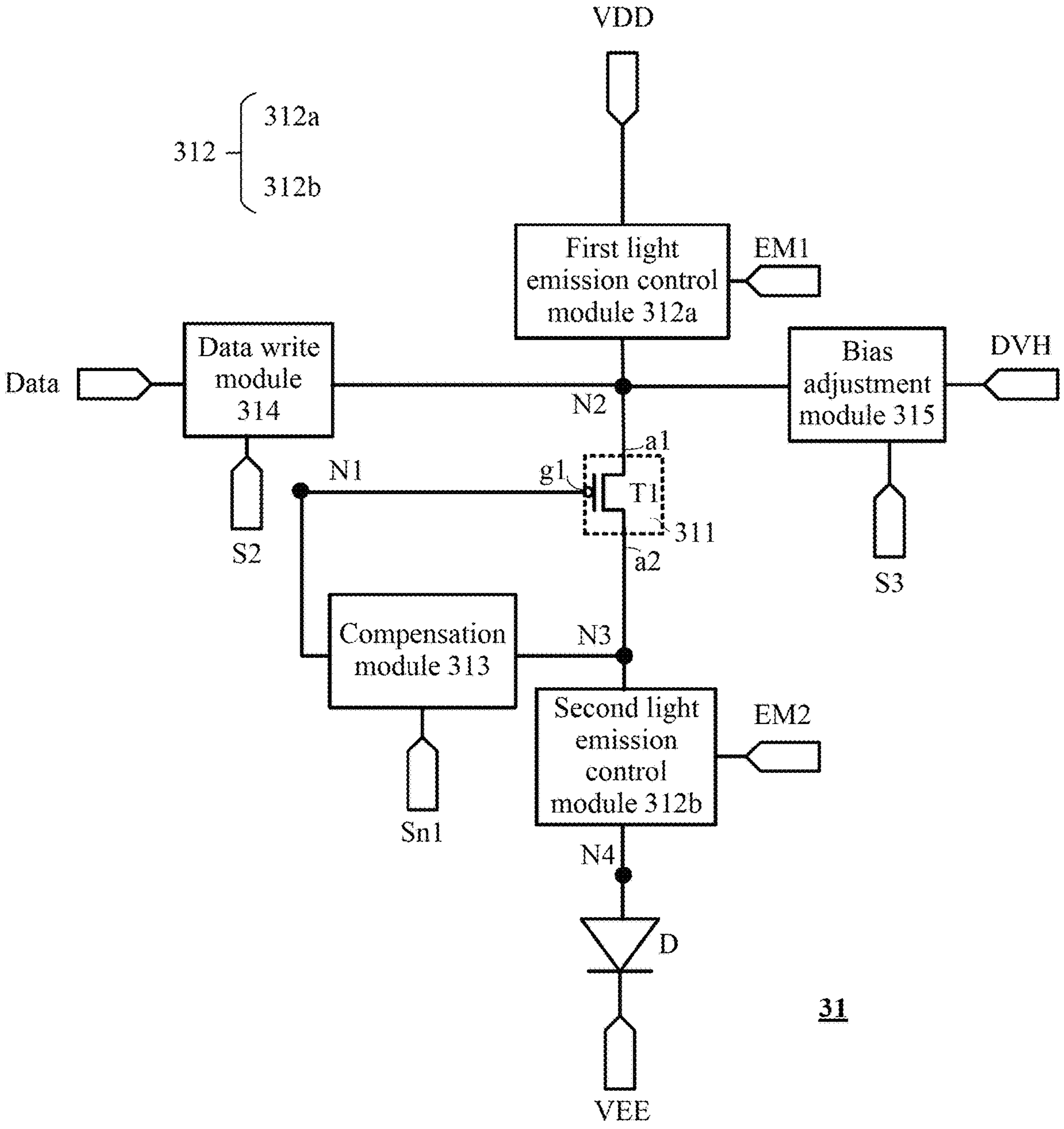
FIG. 12 is another schematic diagram of a pixel circuit of a display panel according to an embodiment of the present application.

FIG. 12 is another schematic diagram of a pixel circuit of a display panel according to an embodiment of the present application. As shown in FIG. 12, according to some embodiments of the present application, the pixel circuit 31 may further include a bias adjustment module 315 connected to the first electrode a1 or the second electrode a2 of the drive transistor T1. FIG. 12 shows an example in which the bias adjustment module 315 is connected to the first electrode a1 of the drive transistor T1; however, in other embodiments, the bias adjustment module 315 may also be connected to the second electrode a2 of the drive transistor T1; and the effects of the two examples are the same or similar, which is not limited in the embodiment of the present application. FIG. 12 is used as an example. For example, in some examples, a control terminal of the bias adjustment module 315 may be electrically connected to a third scan signal line S3, a first terminal of the bias adjustment module 315 may be electrically connected to a bias adjustment signal line DVH, and a second terminal of the bias adjustment module 315 may be electrically connected to the first electrode a1 of the drive transistor T1. The bias adjustment module 315 may be turned on in response to the on level provided by the third scan signal line S3 and transmit a bias adjustment signal of the bias adjustment signal line DVH to the first electrode a1 of the drive transistor T1. Since the drive transistor T1 is controlled by the first node N1 to be turned on, the bias adjustment signal may be transmitted to the second electrode a2 of the drive transistor T1 through the drive transistor T1 so that the potential of the second electrode a2 of the drive transistor T1 is higher than or equal to the potential of the gate g1 of the drive transistor T1, thereby reducing the degree of ion polarization inside the drive transistor T1, for example, reducing the threshold voltage Vth of the drive transistor T1, and adjusting the drift state of the threshold voltage Vth of the drive module.

Figure 13:
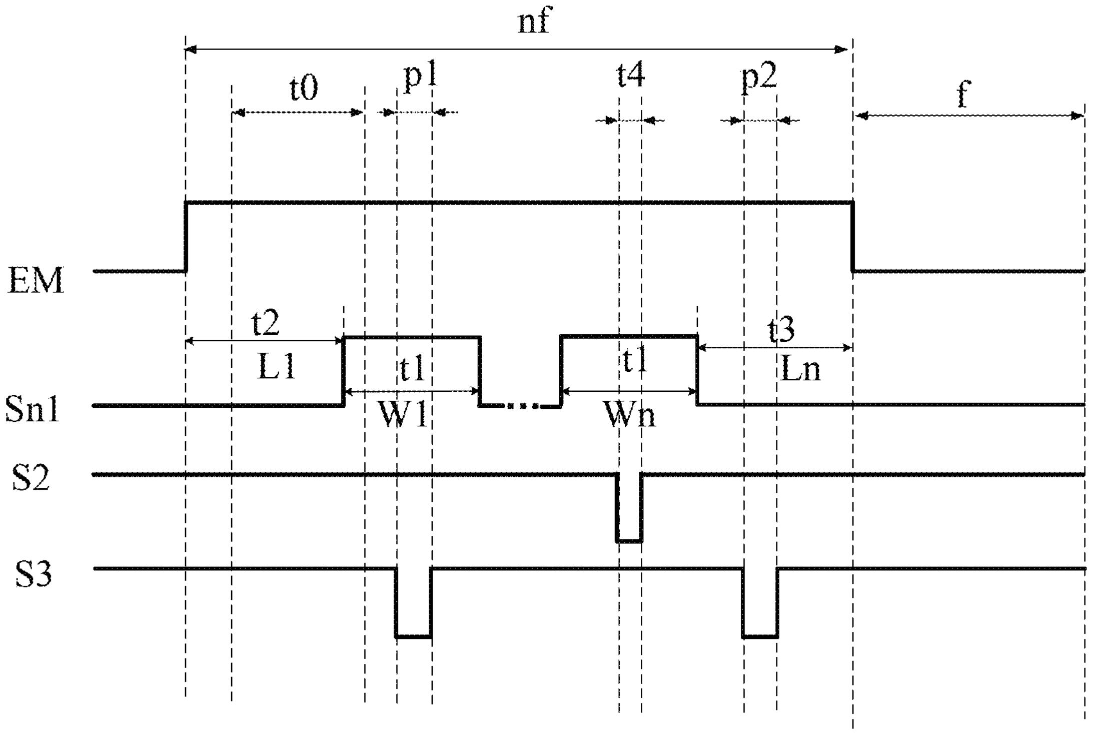
FIG. 13 is another drive timing diagram of a pixel circuit of a display panel according to an embodiment of the present application.

FIG. 13 is another drive timing diagram of a pixel circuit of a display panel according to an embodiment of the present application. In conjunction with FIGS. 12 and 13, the working process of the pixel circuit may further include a bias adjustment stage p, where the bias adjustment stage p may include a first type of bias adjustment stage p1 and/or a second type of bias adjustment stage p2. FIG. 13 shows an example in which the bias adjustment stage p includes both the first type of bias adjustment stage p1 and the second type of bias adjustment stage p2. However, in other embodiments, the bias adjustment stage p may include only the first type of bias adjustment stage p1 or only the second type of bias adjustment stage p2, which is not limited in the present application.

In the first type of bias adjustment stage p1, the compensation module 313 is turned on. For example, in some specific examples, in the first type of bias adjustment stage p1, the compensation module 313 may be turned on in response to the on level (the high level as shown in FIG. 13) of the first scan signal line Sn1, the bias adjustment module 315 may be turned on in response to the on level (the low level as shown in FIG. 13) provided by the third scan signal line S3, and the bias adjustment signal of the bias adjustment signal line DVH is transmitted to the gate g1 of the drive transistor T1 through the bias adjustment module 315, the drive transistor T1, and the compensation module 313 in sequence so that the potential of the second electrode a2 of the drive transistor T1 is equal to the potential of the gate g1 of the drive transistor T1, thereby adjusting the drift state of the threshold voltage of the drive transistor T1.

In the second type of bias adjustment stage p2, the compensation module 313 is turned off. For example, in some specific examples, in the second type of bias adjustment stage p2, the compensation module 313 may be turned off in response to the off level (the high level as shown in FIG. 13) of the first scan signal line Sn1, the bias adjustment module 315 may be turned on in response to the on level (the low level as shown in FIG. 13) provided by the third scan signal line S3, and the bias adjustment signal of the bias adjustment signal line DVH is transmitted to the second electrode a2 of the drive transistor T1 through the bias adjustment module 315 and the drive transistor T1 so that the potential of the second electrode a2 of the drive transistor T1 is higher than the potential of the gate g1 of the drive transistor T1, thereby adjusting the drift state of the threshold voltage of the drive transistor T1.

In this manner, the bias adjustment module 315 adjusts the drift state of the threshold voltage of the drive transistor T1, which is conducive to making the brightness of the first few frames after the screen switching reach the expected brightness, thereby further solving the flicker problem.

Figure 14:
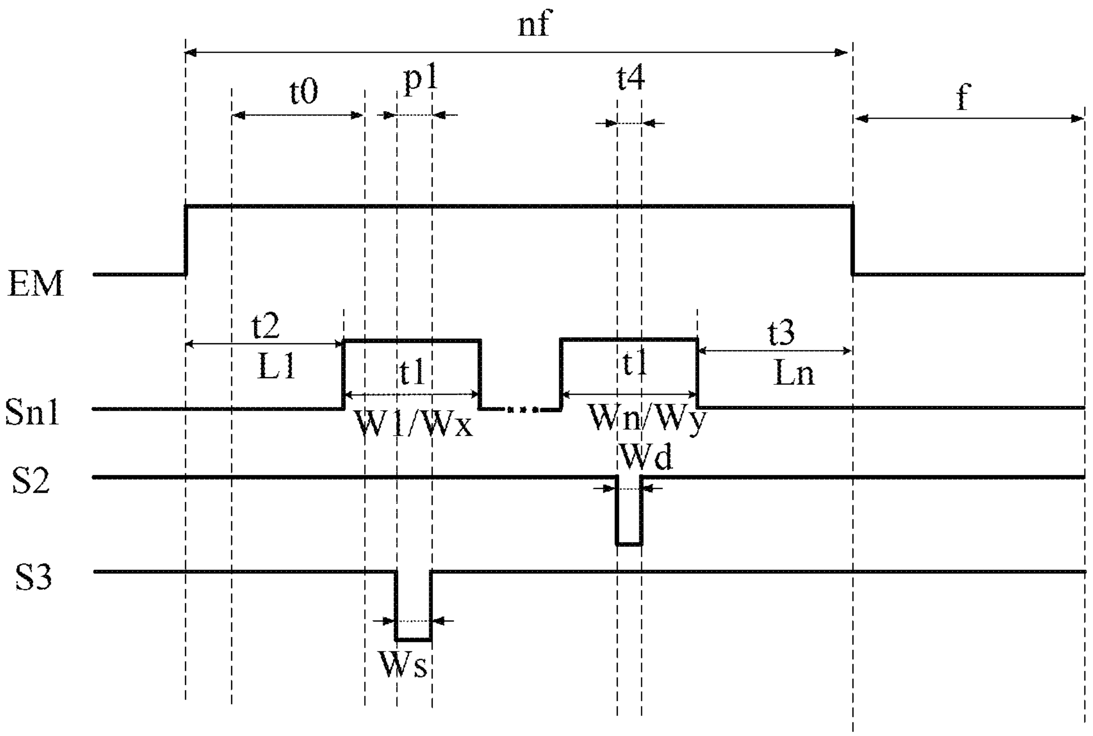
FIG. 14 is another drive timing diagram of a pixel circuit of a display panel according to an embodiment of the present application.

FIG. 14 is another drive timing diagram of a pixel circuit of a display panel according to an embodiment of the present application. As shown in FIG. 14, according to some embodiments of the present application, the non-light-emission stage nf may include at least one first type of bias adjustment stage p1 and at least one data write stage t4. The duration of the first type of bias adjustment stage p1 is Ws, and the duration of the data write stage t4 is Wd.

N>1, that is, the non-light-emission stage nf may include multiple preset stages t1. The x-th preset stage t1 may cover the first type of bias adjustment stage p1, the y-th preset stage t1 may cover the data write stage t4, 1≤x≤N, and 1≤y≤N. FIG. 14 shows an example in which x≠y, for example, x=1, and y=N. However, in other embodiments, x may also be equal to y, that is, the first type of bias adjustment stage p1 and the data write stage t4 may be covered by the same preset stage t1.

The duration of the x-th preset stage t1 is Wx, and the duration of the y-th preset stage t1 is Wy. Wx>Ws and Wy>Wd. That is, the duration of the x-th preset stage t1 is greater than the duration of the first type of bias adjustment stage p1, and the duration of the y-th preset stage t1 is greater than the duration of the data write stage t4.

For example, in some specific embodiments, the start moment of the x-th preset stage t1 may be earlier than the start moment of the first type of bias adjustment stage p1, and the end moment of the x-th preset stage t1 may be later than the end moment of the first type of bias adjustment stage p1. The start moment of the y-th preset stage t1 may be earlier than the start moment of the data write stage t4, and the end moment of the y-th preset stage t1 may be later than the end moment of the data write stage t4.

In this manner, on the one hand, since the x-th preset stage t1 covers the first type of bias adjustment stage p1, the duration is enough for the bias adjustment signal write, and the drift state of the threshold voltage of the drive transistor T1 can be better adjusted; on the other hand, the compensation module 313 is turned on a certain time period earlier and turned off a certain time period later so that it can be ensured that when the data write module 314 writes the bias adjustment signal, the compensation module 313 is on stably, and the accuracy of the bias adjustment signal write can be ensured, for example, the potential of the second electrode a2 of the drive transistor T1 can reach the expected potential.

Similarly, since the y-th preset stage t1 covers the data write stage t4, it can be ensured that the duration is enough for the writing of the data signal; on the other hand, the compensation module 313 is turned on a certain time period earlier and turned off a certain time period later so that it can be ensured that when the data write module 314 writes the data signal, the compensation module 313 is on stably, the accuracy of the data signal write can be ensured, and the potential of the gate g1 of the drive transistor T1 can reach the expected potential.

In some examples, the data write stage t4 may be later than the first type of bias adjustment stage p1. In this manner, it can be ensured that the potential of the gate g1 of the drive transistor T1 can be kept stable after the data signal is written and before the light emission stage f, thereby ensuring that the brightness of the light-emitting element can reach the expected brightness.

Of course, in some other embodiments, at least one first type of bias adjustment stage p1 may also be located after the data write stage t4, for example, the voltage value of the bias adjustment signal written in the last first type of bias adjustment stage p1 may be the same as the voltage value of the data signal written in the data write stage t4 so that it is ensured that the potential of the gate g1 of the drive transistor T1 can reach the preset target potential, thereby ensuring that the brightness of the light-emitting element can reach the expected brightness.

Figure 15:
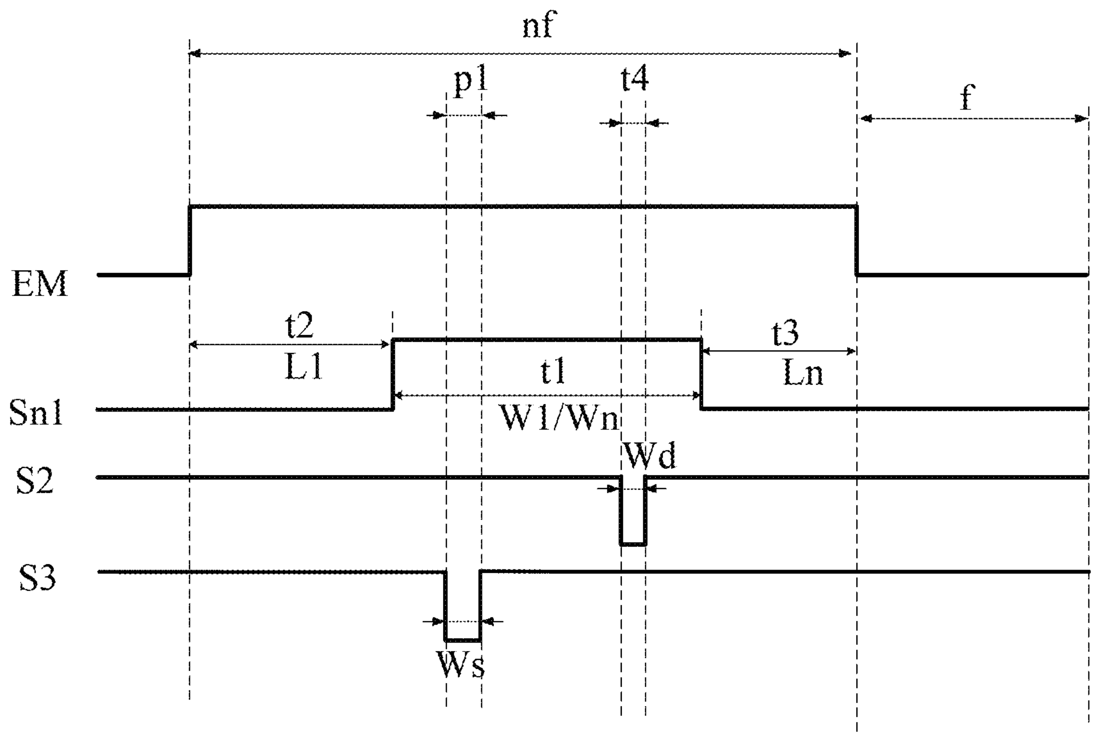
FIG. 15 is another drive timing diagram of a pixel circuit of a display panel according to an embodiment of the present application.

FIG. 15 is another drive timing diagram of a pixel circuit of a display panel according to an embodiment of the present application. As shown in FIG. 15, different from the embodiment shown in FIG. 14, according to other embodiments of the present application, the first type of bias adjustment stage p1 and the data write stage t4 may be covered by the same preset stage t1.

Specifically, the non-light-emission stage nf may include at least one first type of bias adjustment stage p1 and at least one data write stage t4. The duration of the first type of bias adjustment stage p1 is Ws, and the duration of the data write stage t4 is Wd.

N=1, that is, the non-light-emission stage nf may include one preset stage t1. The preset stage t1 may cover the first type of bias adjustment stage p1 and the data write stage t4. It is to be noted that when N>1, the first type of bias adjustment stage p1 and the data write stage t4 may be covered by any one of the N preset stages t1, which is not limited in the embodiment of the present application.

W1=Wn>(Ws+Wd). That is, the duration W1 (or Wn) of the preset stage t1 is greater than the sum of the duration Ws of the first type of bias adjustment stage p1 and the duration Wd of the data write stage t4.

In this manner, since W1=Wn>(Ws+Wd), it can be ensured that the duration is enough for the bias adjustment signal write, the drift state of the threshold voltage of the drive transistor T1 is better adjusted, and the duration is enough for the writing of the data signal.

For example, in some specific embodiments, the first type of bias adjustment stage p1 may be located before the data write stage t4, the start moment of the preset stage t1 may be earlier than the start moment of the first type of bias adjustment stage p1, the end moment of the first type of bias adjustment stage p1 may be earlier than the start moment of the data write stage t4, and the end moment of the preset stage t1 may be later than the end moment of the data write stage t4.

In conjunction with FIGS. 12 and 15, since at least the first type of bias adjustment stage p1 exists between the start moment of the data write stage t4 and the start moment of the preset stage t1, the compensation module 313 is turned on a relatively long time period earlier so that it can be ensured that when the data write module 314 is turned on, the compensation module 313 is on stably, thereby ensuring the accuracy of the data signal write.

After long-term research, the inventor of the present application found that when the duration L1 of the time period t2 between the turn-off of the second light emission control module and the start of the first preset stage t1 is greater than or equal to 20 μs, after the time period t2, the potential of the node (the third node N3 as shown in FIG. 12) between the second light emission control module and the drive transistor and the potential of the node (the fourth node N4 as shown in FIG. 12) between the second light emission control module and the light-emitting element have basically stabilized, and the potential of the fourth node N4 (that is, the potential of the first electrode of the light-emitting element) has been basically fully discharged to a relatively low potential.

In view of this, in some embodiments, L1≥20 μs. For example, in some specific embodiments, L1 may be greater than or equal to 40 μs, 60 μs, 100 μs, 200 μs, or the like, which is not limited in the embodiment of the present application.

In this manner, since the potential of the first electrode of the light-emitting element is fully discharged to a relatively low potential, even if the potential of the first electrode of the light-emitting element is pulled up again under the coupling effect of the parasitic capacitance, the potential of the first electrode of the light-emitting element after being pulled up is still relatively small, and it is difficult for the light-emitting element to emit light again so that the flicker phenomenon can be better solved and the display effect of the display panel can be improved.

After long-term research, the inventor of the present application found that when the duration Ln of the time period t3 between the end of the last preset stage t1 and the turn-on of the second light emission control module is greater than or equal to 20 μs, after the time period t3, the charges generated by the coupling of the parasitic capacitance have been basically released and have little influence on the potential of the fourth node N4 in the light emission stage f.

In view of this, in some embodiments, Ln≥20 μs. For example, in some specific embodiments, Ln may be greater than or equal to 40 μs, 60 μs, 100 μs, 200 μs, or the like, which is not limited in the embodiment of the present application.

In this manner, the influence of the coupling effect of the parasitic capacitance on the potential of the fourth node N4 in the light emission stage f can be greatly reduced so that the brightness of the light-emitting element can reach the expected brightness, and the flicker problem can be solved.

In some embodiments, the display panel can support display in multiple different modes. For example, in different modes, the brightness of the display panel may be different. Moreover/alternatively, in different modes, the fundamental frequencies of the display panel may be different. The fundamental frequency may be the number of on levels (for example, low levels) of the light emission control signal in a preset duration (for example, one second), that is, the number of light emission times in a preset duration. For example, when the fundamental frequency is 60 Hz, the number of on levels of the light emission control signal received by one pixel circuit in the preset duration is 60. When the fundamental frequency is 120 Hz, the number of on levels of the light emission control signal received by one pixel circuit in the preset duration is 120.

Figure 16:
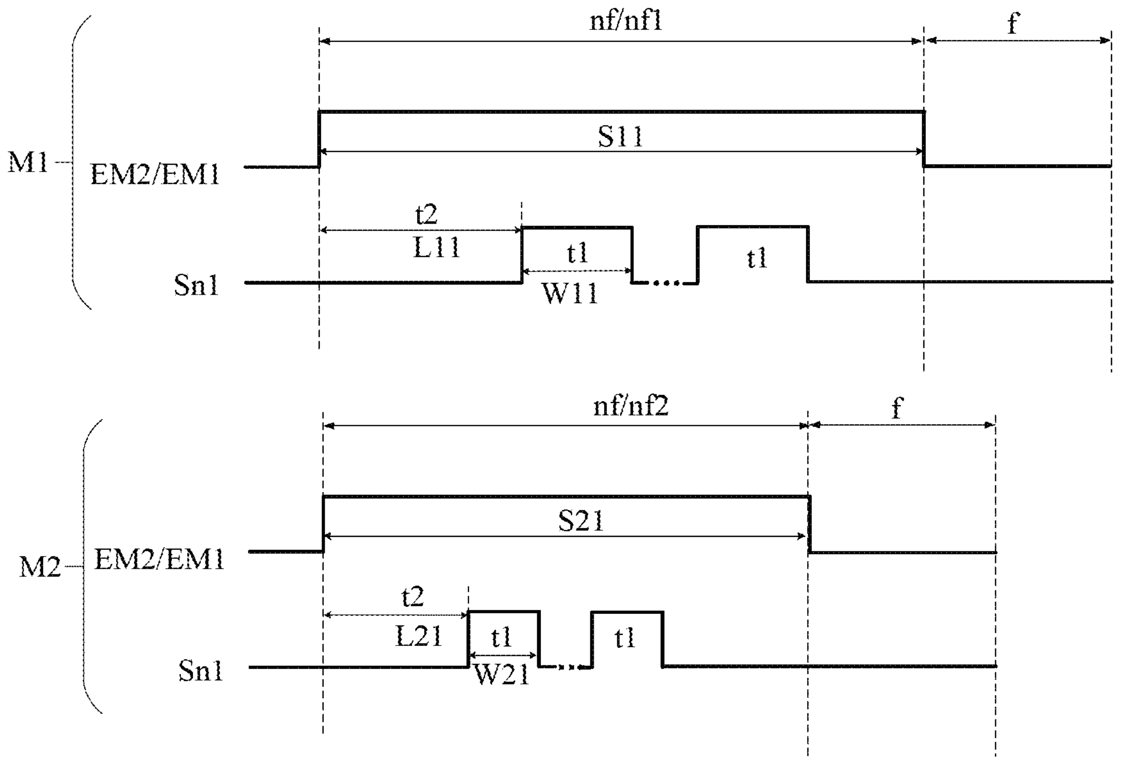
FIG. 16 is another drive timing diagram of a pixel circuit of a display panel according to an embodiment of the present application.

According to some embodiments of the present application, the working process of the display panel may include a first mode and a second mode. FIG. 16 is another drive timing diagram of a pixel circuit of a display panel according to an embodiment of the present application. As shown in FIG. 16, in the first mode M1, the non-light-emission stage nf is a first non-light-emission stage nf1, where the duration of the first non-light-emission stage nf1 is S11. In the second mode M2, the non-light-emission stage nf is a second non-light-emission stage nf2, where the duration of the second non-light-emission stage nf2 is S21. S11 and S21 may be different.

For example, in some examples, the brightness of the display panel in the first mode M1 may be different from the brightness of the display panel in the second mode M2. For example, the brightness of the display panel in the first mode M1 may be less than the brightness of the display panel in the second mode M2. That is, the first mode M1 may be a low brightness mode, and the second mode M2 may be a high brightness mode. Correspondingly, S11>S22. That is to say, when the display panel works in a mode with lower brightness, the duration of the first non-light-emission stage nf1 may be longer, thereby reducing the duty cycle of the light emission control signal and making the brightness of the display panel lower. When the display panel works in a mode with higher brightness, the duration of the first non-light-emission stage nf1 may be shorter, thereby improving the duty cycle of the light emission control signal and making the brightness of the display panel higher.

For example, in some examples, the fundamental frequency of the display panel in the first mode M1 may be different from the fundamental frequency of the display panel in the second mode M2. For example, the fundamental frequency of the display panel in the first mode M1 may be less than the fundamental frequency of the display panel in the second mode M2. Correspondingly, S11>S22. Since the preset duration (such as one second) is constant, when the fundamental frequency is relatively small, the number of on levels of the light emission control signal and the number of off levels of the light emission control signal are relatively small. Therefore, the pulse width of the on level of the light emission control signal and the pulse width of the off level of the light emission control signal are relatively long. Therefore, when the display panel works in a mode with a lower fundamental frequency, the duration of the first non-light-emission stage nf1 may be longer, thereby reducing the number of off levels of the light emission control signal and making the fundamental frequency of the display panel lower. When the display panel works in a mode with a higher fundamental frequency, the duration of the first non-light-emission stage nf1 may be shorter, thereby improving the number of off levels of the light emission control signal and making the fundamental frequency of the display panel higher.

In conjunction with FIGS. 12 and 16, according to some embodiments of the present application, in the first non-light-emission stage nf1, the duration of the time period t2 between the turn-off of the second light emission control module 312*b* and the start of the first preset stage t1 is L11, and the duration of the first preset stage t1 is W11. In the second non-light-emission stage nf2, the duration of the time period t2 between the turn-off of the second light emission control module 312*b* and the start of the first preset stage t1 is L21, and the duration of the first preset stage t1 is W21.

L11>L21. That is, when the brightness of the display panel in the first mode M1 is less than the brightness of the display panel in the second mode M2 and/or when the fundamental frequency of the display panel in the first mode M1 is less than the fundamental frequency of the display panel in the second mode M2, the duration L11 corresponding to the first mode M1 may be greater than the duration L21 corresponding to the second mode M2.

As described earlier, the flicker problem is more noticeable at a lower grayscale and a lower fundamental frequency. Therefore, L11>L21 so that the duration of the time period t2 between the non-light-emission stage and the first preset stage in the case of a lower grayscale and/or a lower fundamental frequency can be further increased. Therefore, it can be ensured that in the case of a lower grayscale and/or a lower fundamental frequency, after the time period t2, the potential of the node (the third node N3 as shown in FIG. 12) between the second light emission control module and the drive transistor and the potential of the node (the fourth node N4 as shown in FIG. 12) between the second light emission control module and the light-emitting element tend to be stable to a large extent so that the potential of the fourth node N4 (that is, the potential of the first electrode of the light-emitting element) is fully discharged to a relatively low potential. In this manner, the flicker phenomenon in the case of a lower grayscale and/or a lower fundamental frequency is better solved, and the display effect of the display panel is improved.

In conjunction with FIGS. 12 and 16, according to some embodiments of the present application, L11>W11, and L21>W21. That is, in some examples, the duration of the time period t2 between the turn-off of the second light emission control module 312*b* and the start of the first preset stage t1 may be increased so that the duration of the first non-light-emission stage nf1 satisfies the expected requirement.

In this manner, not only the duration of the first non-light-emission stage nf1 can satisfy the expected requirement, but also it can be ensured that the duration of the time period t2 between the non-light-emission stage and the first preset stage in the case of a lower grayscale and/or a lower fundamental frequency is relatively long, and it can be ensured that the duration of the time period t2 between the non-light-emission stage and the first preset stage in the case of a higher grayscale and/or a higher fundamental frequency is also relatively long. In this manner, not only the flicker phenomenon in the case of a lower grayscale and/or a lower fundamental frequency can be better solved, but also the flicker phenomenon in the case of a higher grayscale and/or a higher fundamental frequency can be better solved, thereby greatly improving the display effect of the display panel.

Figure 17:
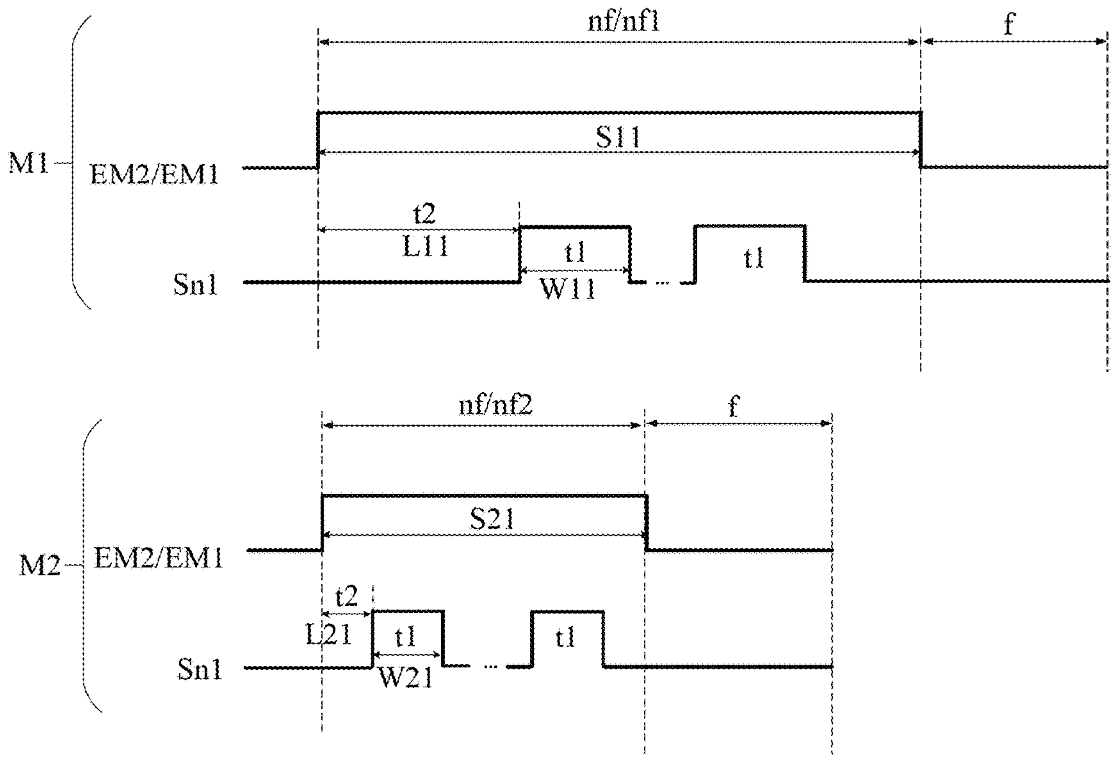
FIG. 17 is another drive timing diagram of a pixel circuit of a display panel according to an embodiment of the present application.

FIG. 17 is another drive timing diagram of a pixel circuit of a display panel according to an embodiment of the present application. As shown in FIG. 17, according to some embodiments of the present application, L11>W11, and L21<W21. As described above, when the display panel works in a mode with higher brightness or a mode with a higher fundamental frequency, the duration of the first non-light-emission stage nf1 is relatively small, and the preset stage t1 needs to be ensured to have a certain duration. Therefore, in the second mode M2, L21 may be less than W21 so that the duration of the first non-light-emission stage nf1 in the second mode M2 satisfies the preset requirement, thereby ensuring that the display panel can work in the mode with higher brightness or in the mode with a higher fundamental frequency.

Moreover, the flicker phenomenon is relatively not noticeable at a higher grayscale and/or a higher fundamental frequency. Therefore, in some examples, L21<W21 so that the duration of the first non-light-emission stage nf1 in the second mode M2 satisfies the preset requirement, thereby ensuring that the display panel can work in the mode with higher brightness or in the mode with a higher fundamental frequency.

In addition, L11>L21 so that the duration of the time period t2 between the non-light-emission stage and the first preset stage in the case of a lower grayscale and/or a lower fundamental frequency can be further increased. Therefore, it can be ensured that in the case of a lower grayscale and/or a lower fundamental frequency, after the time period t2, the potential of the node (the third node N3 as shown in FIG. 12) between the second light emission control module and the drive transistor and the potential of the node (the fourth node N4 as shown in FIG. 12) between the second light emission control module and the light-emitting element tend to be stable to a large extent so that the potential of the fourth node N4 (that is, the potential of the first electrode of the light-emitting element) is fully discharged to a relatively low potential. In this manner, the flicker phenomenon in the case of a lower grayscale and/or a lower fundamental frequency is better solved, and the display effect of the display panel is improved.

With continued reference to FIG. 17, according to some embodiments of the present application, $$(L11-W11)>(W21-L21).$$

That is, it is ensured that in the first mode M1, the duration of the time period t2 between the turn-off of the second light emission control module and the start of the first preset stage t1 is relatively long. Alternatively, it is ensured that in the second mode M2, W21–L21 is not too large, that is, it is ensured that L21 should not be too small.

In this manner, the flicker phenomenon in the case of a lower grayscale and/or a lower fundamental frequency can be better solved, and the flicker phenomenon in the case of a higher grayscale and/or a higher fundamental frequency can be better solved, thereby greatly improving the display effect of the display panel.

Figure 18:
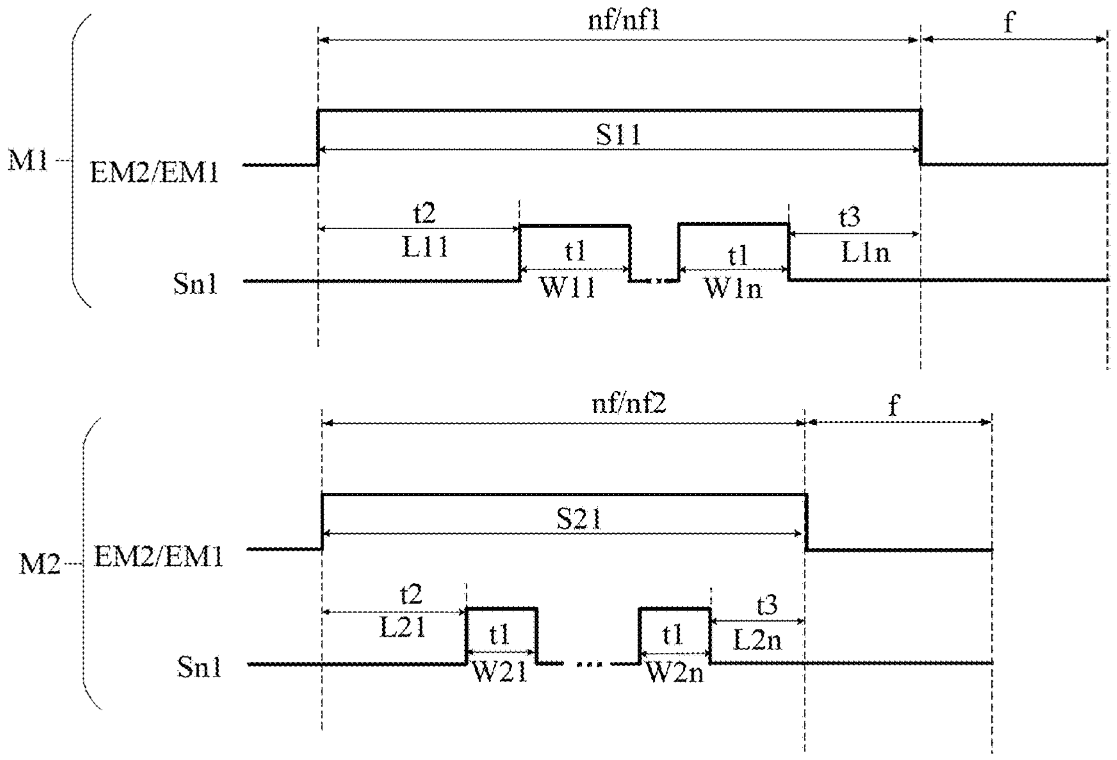
FIG. 18 is another drive timing diagram of a pixel circuit of a display panel according to an embodiment of the present application.

FIG. 18 is another drive timing diagram of a pixel circuit of a display panel according to an embodiment of the present application. In conjunction with FIGS. 12 and 18, according to some embodiments of the present application, in the first non-light-emission stage nf1, the duration of the time period t3 between the end of the last preset stage t1 and the turn-on of the second light emission control module 312*b* is L1*n*, and the duration of the last preset stage t1 is W1*n*. In the second non-light-emission stage nf2, the duration of the time period t3 between the end of the last preset stage t1 and the turn-on of the second light emission control module 312*b* is L2*n*, and the duration of the last preset stage t1 is W2*n*.

L1*n*≥L2*n*. That is, when the brightness of the display panel in the first mode M1 is less than the brightness of the display panel in the second mode M2 and/or when the fundamental frequency of the display panel in the first mode M1 is less than the fundamental frequency of the display panel in the second mode M2, the duration L1*n* corresponding to the first mode M1 may be greater than or equal to the duration L2*n* corresponding to the second mode M2.

That is to say, in the case of a lower grayscale and/or a lower fundamental frequency, the duration of the time period t3 between the end of the last preset stage t1 and the turn-on of the second light emission control module 312*b* may be configured to be relatively large.

In this manner, in the case of a lower grayscale and/or a lower fundamental frequency, the duration of the time period t3 between the end moment of the last preset stage t1 and the moment at which the second light emission control module 312*b* is turned on is relatively long so that the influence of the coupling effect of the parasitic capacitance on the potential of the fourth node N4 in the light emission stage f can be reduced, the brightness of the light-emitting element can reach the expected brightness, and the flicker problem is solved.

In conjunction with FIGS. 12 and 18, according to some embodiments of the present application, L1*n*>W1*n*, and L2*n*>W2*n*. That is, in some examples, the duration of the time period t3 between the end of the last preset stage t1 and the turn-on of the second light emission control module 312*b* may be increased so that the duration of the first non-light-emission stage nf1 satisfies the expected requirement.

In this manner, not only the duration of the first non-light-emission stage nf1 can satisfy the expected requirement, but also it can be ensured that the influence of the coupling effect of the parasitic capacitance on the potential of the fourth node N4 in the light emission stage f is reduced in the case of a lower grayscale and/or a lower fundamental frequency, and it can also be ensured that the influence of the coupling effect of the parasitic capacitance on the potential of the fourth node N4 in the light emission stage f is reduced in the case of a higher grayscale and/or a higher fundamental frequency. In this manner, the brightness of the light-emitting element can reach the expected brightness to a large extent, and the flicker problem can be solved to a large extent.

Figure 19:
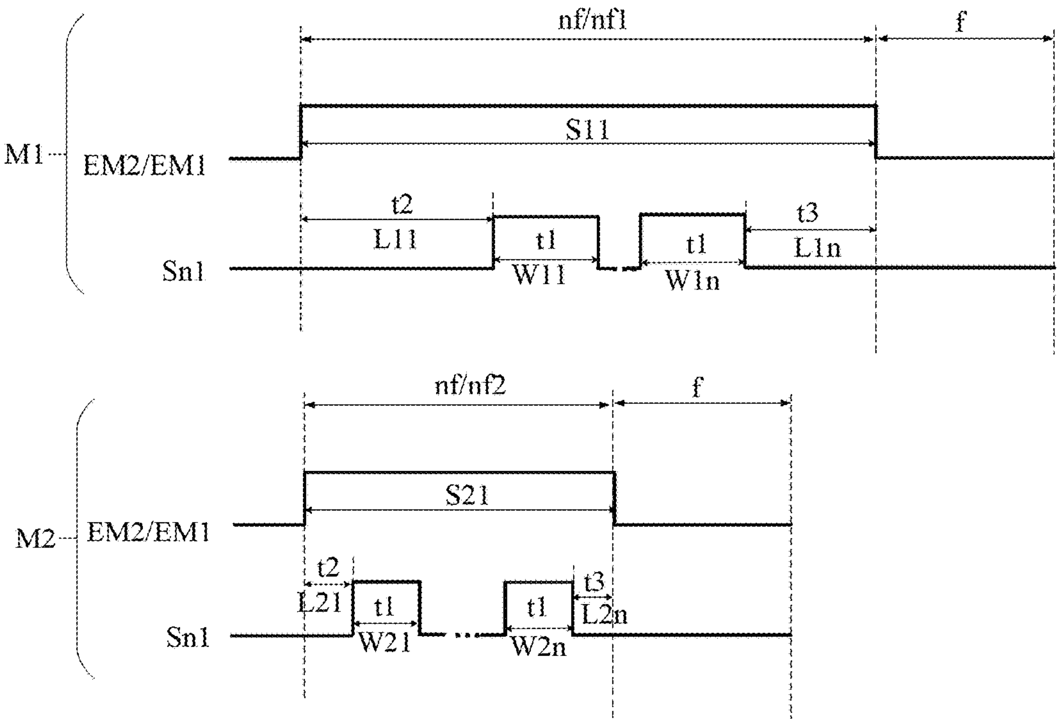
FIG. 19 is another drive timing diagram of a pixel circuit of a display panel according to an embodiment of the present application.

FIG. 19 is another drive timing diagram of a pixel circuit of a display panel according to an embodiment of the present application. As shown in FIG. 19, according to some embodiments of the present application, L1*n*>W1*n*, and L2*n*<W2*n*. As described above, when the display panel works in a mode with higher brightness or a mode with a higher fundamental frequency, the duration of the first non-light-emission stage nf1 is relatively small, and the preset stage t1 needs to be ensured to have a certain duration. Therefore, in the second mode M2, L2*n* may be less than W2*n* so that the duration of the first non-light-emission stage nf1 in the second mode M2 satisfies the preset requirement, thereby ensuring that the display panel can work in the mode with higher brightness or in the mode with a higher fundamental frequency.

Moreover, the flicker phenomenon is relatively not noticeable at a higher grayscale and/or a higher fundamental frequency. Therefore, in some examples, L2n<W2n so that the duration of the first non-light-emission stage nf1 in the second mode M2 satisfies the preset requirement, thereby ensuring that the display panel can work in the mode with higher brightness or in the mode with a higher fundamental frequency.

In addition, L1n>W1n so that it can be ensured that the duration of the time period t3 between the end of the last preset stage t1 and the turn-on of the second light emission control module 312b is relatively long in the case of a lower grayscale and/or a lower fundamental frequency so that the influence of the coupling effect of the parasitic capacitance on the potential of the fourth node N4 in the light emission stage f is reduced, the brightness of the light-emitting element can reach the expected brightness, and the flicker problem is solved.

With continued reference to FIG. 19, according to some embodiments of the present application, $$(L1n - W1n) > (W2n - L2n).$$

That is, it is ensured that in the first mode M1, the duration of the time period t3 between the end of the last preset stage t1 and the turn-on of the second light emission control module is relatively long. Alternatively, it is ensured that in the second mode M2, W2n–L2n is not too large, that is, it is ensured that L2n should not be too small.

In this manner, it can be ensured that the influence of the coupling effect of the parasitic capacitance on the potential of the fourth node N4 in the light emission stage f is reduced in the case of a lower grayscale and/or a lower fundamental frequency, and it can also be ensured that the influence of the coupling effect of the parasitic capacitance on the potential of the fourth node N4 in the light emission stage f is reduced in the case of a higher grayscale and/or a higher fundamental frequency. In this manner, the brightness of the light-emitting element can reach the expected brightness to a large extent, and the flicker problem can be solved to a large extent.

Figure 20:
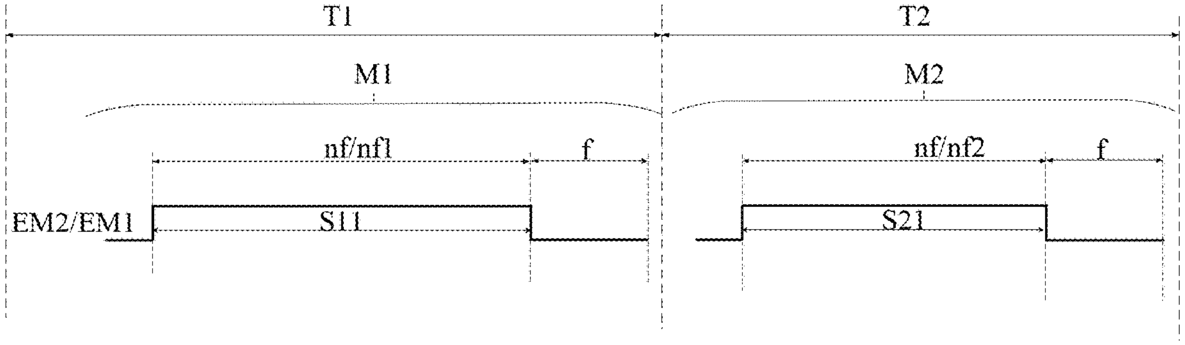
FIG. 20 is a schematic diagram illustrating a working process of a display panel according to an embodiment of the present application.

FIG. 20 is a schematic diagram illustrating a working process of a display panel according to an embodiment of the present application. As shown in FIG. 20, according to some embodiments of the present application, the working process of the display panel may include a first time period T1 and a second time period T2, where the first time period T1 and the second time period T2 are different time periods.

In conjunction with FIGS. 4 and 20, in the first time period T1, the pixel circuit 31 may work in the first mode M1. In the second time period T2, the pixel circuit 31 may work in the second mode M2. In some examples, the brightness of the display panel in the first mode M1 may be different from the brightness of the display panel in the second mode M2. Moreover/alternatively, the fundamental frequency of the display panel in the first mode M1 may be different from the fundamental frequency of the display panel in the second mode M2. For example, the brightness of the display panel in the first mode M1 may be less than the brightness of the display panel in the second mode M2. For example, the fundamental frequency of the display panel in the first mode M1 may be less than the fundamental frequency of the display panel in the second mode M2.

In this manner, in different time periods, the pixel circuit may work in different modes, so as to satisfy different application scenarios.

Figure 21:
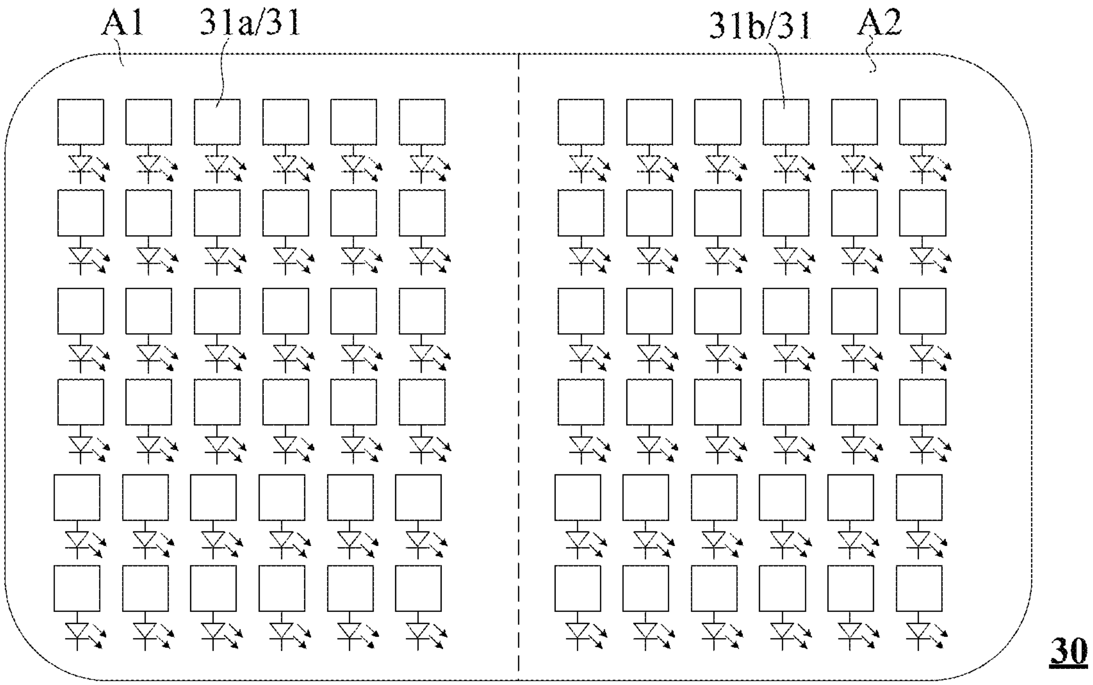
FIG. 21 is a structural diagram of a display panel according to an embodiment of the present application.

FIG. 21 is a structural diagram of a display panel according to an embodiment of the present application. As shown in FIG. 21, according to some embodiments of the present application, the display panel 30 may include a first pixel circuit 31a and a second pixel circuit 31b. The first pixel circuit 31a and the second pixel circuit 31b are pixel circuits 31 at different positions.

In conjunction with FIGS. 16 and 21, in at least part of a time period of the working process of the display panel, the first pixel circuit 31a may work in the first mode M1, and the second pixel circuit 31b may work in the second mode M2.

That is, in the same time period, the first pixel circuit 31a may work in the first mode M1, and the second pixel circuit 31b may work in the second mode M2 so that different regions in the display panel can be displayed in different modes to satisfy requirements of a user.

For example, in some examples, the display panel 30 may include a first display region A1 and a second display region A2. Both the first display region A1 and the second display region A2 can be used for displaying images. The first pixel circuit 31a may be located in the first display region A1, and the second pixel circuit 31b may be located in the second display region A2.

For example, in the same time period, the first display region A1 may be displayed in a first mode with lower brightness, and the second display region A2 may be displayed in a second mode with higher brightness. For example, in some specific application embodiments, the first display region A1 may be used for displaying an offscreen image including information such as a clock, and the second display region A2 may be used for displaying complex images in a game or video scenario.

In this manner, the first display region A1 of the display panel is displayed according to the first mode, and the second display region A2 of the display panel is displayed according to the second mode, that is, different regions in the display panel are displayed according to different modes, and multiple screens can be displayed simultaneously to satisfy requirements of the user.

According to some embodiments of the present application, the data refresh rate of the first pixel circuit 31a may be Fs1, and the data refresh rate of the second pixel circuit 31b may be Fs2. Fs1≠Fs2. The data refresh rate is different from the fundamental frequency, and the data refresh rate may be the number of times of writing data signals in a preset duration (for example, one second). For example, when the data refresh rate is 1 Hz, the data signal may be written only once in the preset duration. When the data refresh rate is 60 Hz, the data signal may be written 60 times in the preset duration. Therefore, the data refresh rate may also be understood as a screen refresh rate.

Since the first pixel circuit 31a works in the first mode M1 and the second pixel circuit 31b works in the second mode M2, the data refresh rate of the first pixel circuit 31a and the data refresh rate of the second pixel circuit 31b may be different, so as to satisfy the display requirements in different modes and improve the display quality in the first mode M1 and the display quality in the second mode M2.

For example, in some specific embodiments, Fs1<Fs2. As described above, the brightness corresponding to the first mode M1 is lower, and the brightness corresponding to the second mode M2 is higher. For example, the first display region A1 is used for displaying the offscreen image including information such as a clock, and the second display region A2 is used for displaying complex images in a game or video scenario. Therefore, in the first mode M1, a lower data refresh rate may be used so as to reduce the power consumption of the display panel. In the second mode M2, a higher data refresh rate may be used so as to improve the fluency of the screen and improve the user experience.

In other specific embodiments, Fs1 may be greater than Fs2. That is, in the first mode M1, a higher data refresh rate may be used; and in the second mode M2, a lower data refresh rate may be used, which is not limited in the embodiment of the present application.

To facilitate the understanding of the embodiment of the present application, the display panel provided in the embodiment of the present application is illustrated below in conjunction with an 8T1C pixel circuit.

Figure 22:
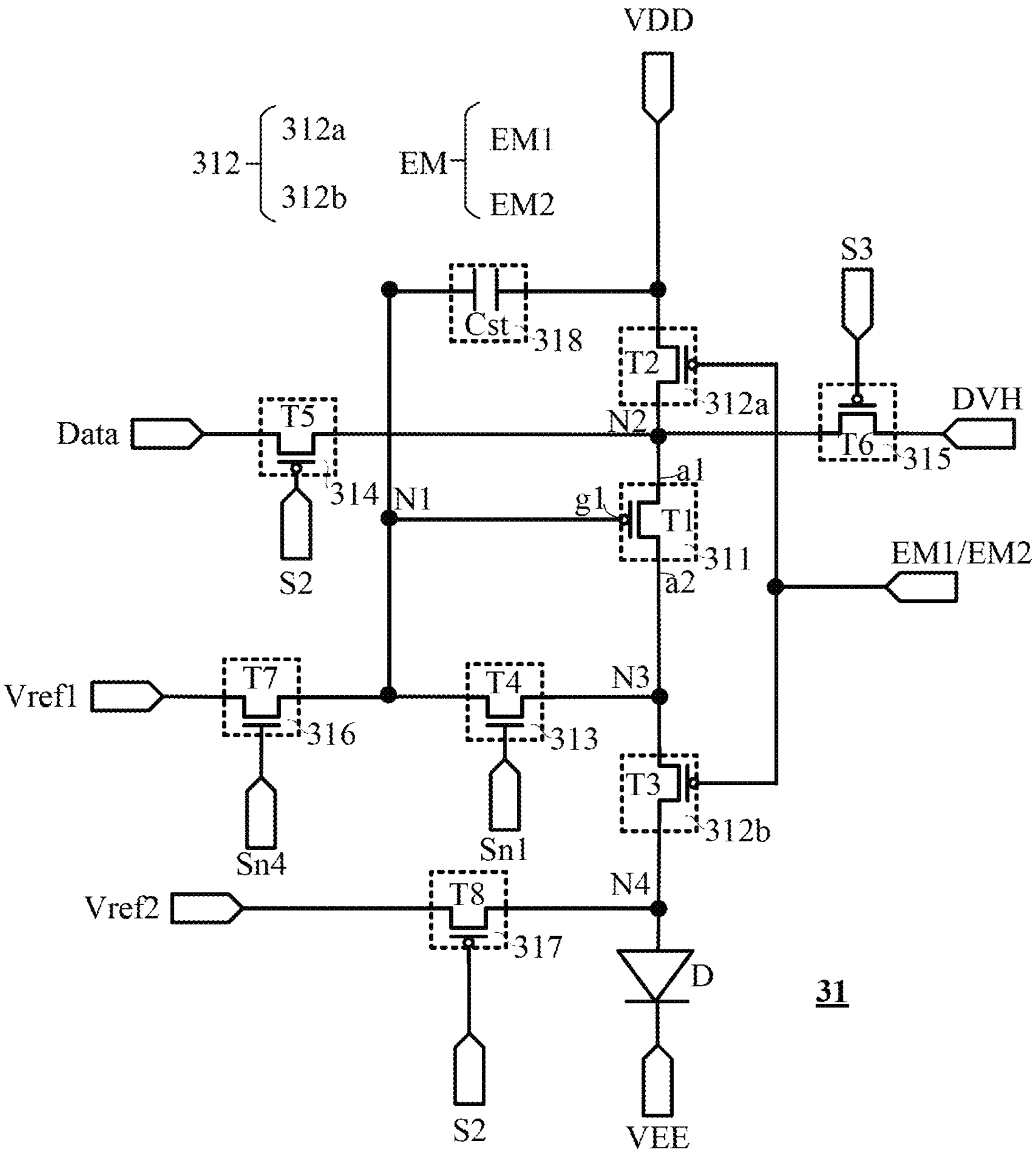
FIG. 22 is another schematic diagram of a pixel circuit of a display panel according to an embodiment of the present application.
Figure 23:
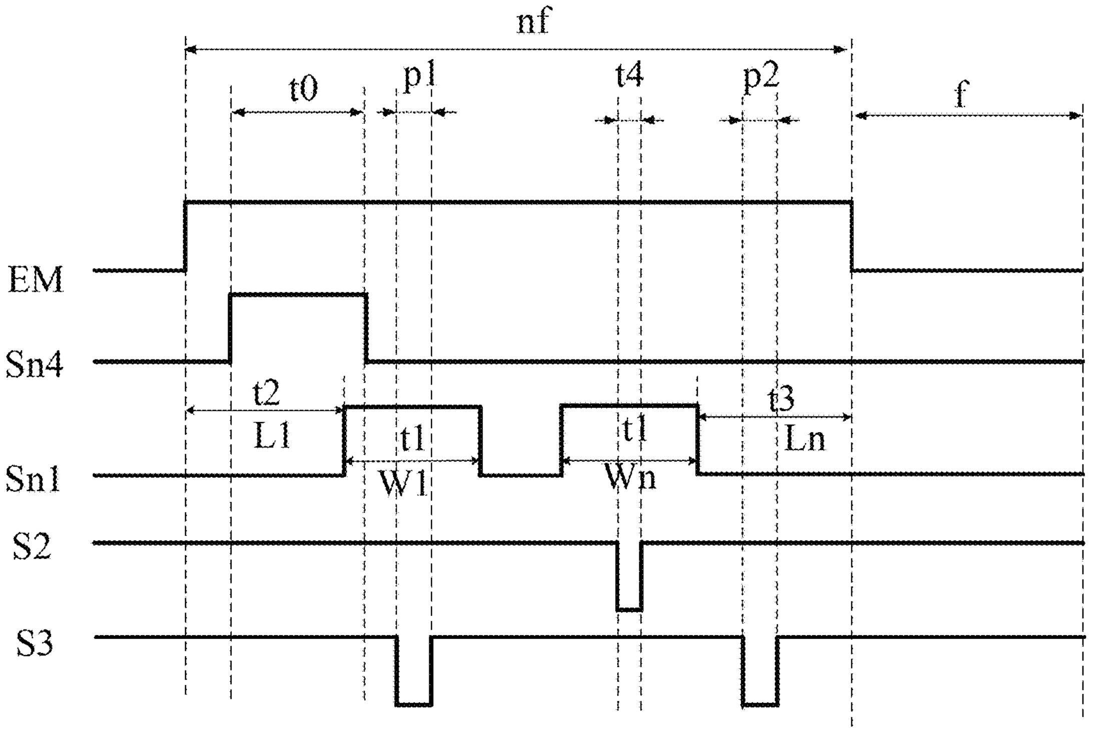
FIG. 23 is a drive timing diagram corresponding to the pixel circuit shown in FIG. 22.

FIG. 22 is another schematic diagram of a pixel circuit of a display panel according to an embodiment of the present application. FIG. 23 is a drive timing diagram corresponding to the pixel circuit shown in FIG. 22. In conjunction with FIGS. 22 and 23, the pixel circuit 31 includes the drive module 311, the light emission control module 312, the compensation module 313, the data write module 314, the bias adjustment module 315, a first reset module 316, a second reset module 317, and a storage module 318. The light emission control module 312 may include the first light emission control module 312*a* and the second light emission control module 312*b*.

The drive module 311 may include the drive transistor T1, the first light emission control module 312*a* may include a second transistor T2, the second light emission control module 312*b* may include a third transistor T3, the compensation module 313 may include a fourth transistor T4, the data write module 314 may include a fifth transistor T5, the bias adjustment module 315 may include a sixth transistor T6, the first reset module 316 may include a seventh transistor T7, the second reset module 317 may include an eighth transistor T8, and the storage module 318 may include a storage capacitor Cst. The connection manner of each transistor and the storage capacitor Cst is shown in FIG. 22, and the details are not repeated here.

In some embodiments, the first light emission control signal line EM1 may be reused as the second light emission control signal line EM2, and the first light emission control signal line EM1 and the second light emission control signal line EM2 are collectively represented by the light emission control signal line EM.

In some embodiments, the fourth transistor T4 and the seventh transistor T7 may be N-type transistors, and other transistors may be P-type transistors.

FIG. 23 shows an example in which the non-light-emission stage nf includes two preset stages t1. In conjunction with FIGS. 22 and 23, the non-light-emission stage nf may further include a reset stage t0. In the reset stage t0, the first reset module 316 is controlled by a fourth scan signal line Sn4 to be turned on and transmits a first reset signal of a first reset signal line Vref1 to the first node N1 to reset the first node N1.

In the first type of bias adjustment stage p1, the compensation module 313 may be turned on in response to the on level of the first scan signal line Sn1, the bias adjustment module 315 may be turned on in response to the on level provided by the third scan signal line S3, and the bias adjustment signal of the bias adjustment signal line DVH is transmitted to the gate g1 of the drive transistor T1 through the bias adjustment module 315, the drive transistor T1, and the compensation module 313 in sequence so that the potential of the second electrode a2 of the drive transistor T1 is equal to the potential of the gate g1 of the drive transistor T1, thereby adjusting the drift state of the threshold voltage of the drive transistor T1.

In the data write stage t4, the data write module 314 is turned on in response to the on level provided by the second scan signal line S2, the compensation module 313 is turned on in response to the on level provided by the first scan signal line Sn1, and the data signal of the data signal line data is written into the first node N1 through the data write module 314, the drive transistor T1, and the compensation module 313 in sequence. The second reset module 317 is controlled by the second scan signal line S2 to be turned on and transmits a second reset signal of a second reset signal line Vref2 to the first electrode of the light-emitting element D to reset the first electrode of the light-emitting element D.

In the second type of bias adjustment stage p2, the compensation module 313 may be turned off in response to the off level of the first scan signal line Sn1, the bias adjustment module 315 may be turned on in response to the on level provided by the third scan signal line S3, and the bias adjustment signal of the bias adjustment signal line DVH is transmitted to the second electrode a2 of the drive transistor T1 through the bias adjustment module 315 and the drive transistor T1 so that the potential of the second electrode a2 of the drive transistor T1 is higher than the potential of the gate g1 of the drive transistor T1, thereby adjusting the drift state of the threshold voltage of the drive transistor T1.

In the light emission stage f, the first light emission control module 312*a* and the second light emission control module 312*b* are controlled by the light emission control signal line EM to be turned on, the drive current provided by the pixel circuit 31 is transmitted to the first electrode of the light-emitting element D, and the light-emitting element D emits light.

In the embodiment of the present application, the duration L1 of the time period t2 is greater than W1 so that it can be ensured that the duration of the time period t2 between the non-light-emission stage and the first preset stage is relatively long. Therefore, after the time period t2, the potential of the third node N3 and the potential of the fourth node N4 tend to be stable so that the potential of the first electrode of the light-emitting element is fully discharged to a relatively low potential. In this manner, since the potential of the first electrode of the light-emitting element is fully discharged to a relatively low potential, even if the potential of the first electrode of the light-emitting element is pulled up again under the coupling effect of the parasitic capacitance, the potential of the first electrode of the light-emitting element after being pulled up is still relatively small, and it is difficult for the light-emitting element to emit light again so that the flicker phenomenon can be better solved and the display effect of the display panel can be improved.

In some embodiments, the duration Ln of the time period t3 is greater than Wn. In this manner, it can be ensured that the duration of the time period t3 between the end of the last preset stage t1 and the turn-on of the second light emission control module 312*b* is relatively long so that the influence of the coupling effect of the parasitic capacitance on the potential of the fourth node N4 in the light emission stage f is reduced, the brightness of the light-emitting element can reach the expected brightness, and the flicker problem is solved.

Figure 24:
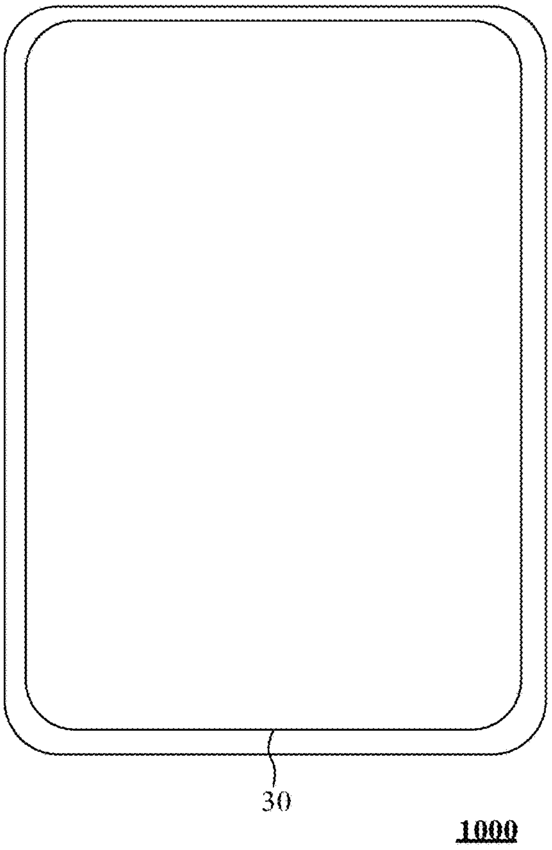
FIG. 24 is a structural diagram of a display device according to an embodiment of the present application.

Based on the display panel provided in the preceding embodiments, correspondingly, the present application further provides a display device including the display panel provided in the present application. Referring to FIG. 24, FIG. 24 is a structural diagram of a display device according to an embodiment of the present application. A display device 1000 provided in FIG. 24 includes the display panel 30 provided in any one of the preceding embodiments of the present application. In the embodiment of FIG. 24, the case where the display device 1000 is a mobile phone is used as an example for description. It is to be understood that the display device provided in the embodiment of the present application may be a wearable product, a computer, a television, an in-vehicle display device, and another display device with a display function, which is not specifically limited in the present application. The display device provided in the embodiment of the present application has the beneficial effects of the display panel 30 provided in the embodiment of the present application. For details, reference may be made to the specific description of the display panel 30 in the preceding embodiments, and the details are not repeated here in this embodiment.

It is to be understood that the specific structure of the circuit and the timing of the display panel provided in the drawings of the embodiments of the present application are merely some examples and are not intended to limit the present application. In addition, the preceding embodiments provided in the present application may be combined with each other if there is no contradiction.

It is to be noted that the various embodiments in this specification are described in a progressive manner. The same or similar parts in the various embodiments are referred to each other. Each embodiment focuses on differences from the other embodiments. According to the embodiments of the present application as described above, these embodiments do not describe all details, nor do they limit the present application to only the specific embodiments described. Apparently, many modifications and variations are possible in light of the preceding description. This specification selects and specifically describes these embodiments to better explain the principles and practical applications of the present application so that those skilled in the art can make good use of the present application and the modification based on the present application. The present application is limited only by the claims, along with the full scope and equivalents of the claims.

Those skilled in the art should understand that the preceding embodiments are illustrative rather than restrictive. Different technical features in different embodiments can be combined to achieve the beneficial effects. Those skilled in the art should be able to understand and implement other modified embodiments of the disclosed embodiments on the basis of studying the drawings, specification, and claims. In the claims, the term "comprising" does not exclude other structures; the number refers to "one" but does not exclude "a plurality"; and the terms "first" and "second" are used to indicate names rather than to indicate any specific order. Any reference numeral in the claims should not be construed as limiting the scope. The appearance of certain technical features in different dependent claims does not mean that these technical features cannot be combined to achieve the beneficial effects.

What is claimed is:

1. A display panel, comprising:

a pixel circuit and a light-emitting element;

wherein the pixel circuit comprises a drive module, a light emission control module, and a compensation module;

the drive module comprises a drive transistor, wherein the drive transistor comprises a gate, a first electrode, and a second electrode;

the light emission control module comprises a first light emission control module and a second light emission control module, wherein the first light emission control module is connected between a first power signal line and the drive transistor, and the second light emission control module is connected between the drive transistor and the light-emitting element;

the compensation module is connected between the gate and the second electrode of the drive transistor, and a time period during which the compensation module is on is a preset stage;

wherein a working process of the pixel circuit comprises a non-light-emission stage and a light emission stage, and the non-light-emission stage comprises at least one preset stage;

in the light emission stage, the first light emission control module and the second light emission control module are turned on;

in the non-light-emission stage, at least the second light emission control module is turned off;

wherein the display panel satisfies at least one of:

in the non-light-emission stage, a duration of a time period between a turn-off of the second light emission control module and a start of a first preset stage of the at least one preset stage is $L\mathbf{1}$, and a duration of the first preset stage is $W\mathbf{1}$, wherein $L\mathbf{1}>W\mathbf{1}$; or, in the non-light-emission stage, a duration of a time period between an end of a last preset stage of the at least one preset stage and turn-on of the second light emission control module is $Ln$, and a duration of the last preset stage is $Wn$, wherein $Ln>Wn$;

wherein the at least one preset stage comprises N preset stages, wherein $N\geq 1$;

wherein in a case where $N=1$, $W\mathbf{1}=Wn$; or, in a case where $N>1$, $W\mathbf{1}=Wn$ or $W\mathbf{1}$ $Wn$;

wherein the pixel circuit comprises a data write module connected to the first electrode of the drive transistor; and the working process of the pixel circuit comprises a data write stage;

wherein in the data write stage, the data write module and the compensation module are on, and the data write module provides a data signal for the drive transistor wherein the pixel circuit comprises a bias adjustment module connected to the first electrode or the second electrode of the drive transistor; and the working process of the pixel circuit comprises a bias adjustment stage, wherein the bias adjustment stage comprises a first type of bias adjustment stage; and wherein in the first type of bias adjustment stage, the compensation module is on.

2. The display panel of claim 1, wherein a duration of the data write stage is $Wd$; and $N=1$, the preset stage covers the data write stage, and $W\mathbf{1}=Wn>Wd$; or, $N>1$, an i-th preset stage of the at least one preset stage covers the data write stage, $Wi>Wd$, $Wi$ denotes a duration of the i-th preset stage, and $1\leq i\leq N$.

3. The display panel of claim 2, wherein $N>1$, an N-th preset stage of the at least one preset stage covers the data write stage, and $Wn>Wd$, $Wn>Wj$, and $1\leq j\leq N-1$.

4. The display panel of claim 1, wherein the non-light-emission stage comprises at least one of the first type of bias adjustment stage, a duration of the first type of bias adjustment stage is Ws, and a duration of the data write stage is Wd; and N>1, an x-th preset stage of the at least one preset stage covers the first type of bias adjustment stage, a y-th preset stage of the at least one preset stage covers the data write stage, 1≤x≤N, and 1≤y≤N;

wherein Wx>Ws and Wy>Wd; and wherein Wx denotes a duration of the x-th preset stage t1, Wy denotes a duration of the y-th preset stage t1.

5. The display panel of claim 2, wherein the non-light-emission stage comprises at least one of the first type of bias adjustment stage, the duration of the first type of bias adjustment stage is Ws, and the duration of the data write stage is Wd; and N=1, and the preset stage covers the first type of bias adjustment stage and the data write stage;

wherein W1=Wn>(Ws+Wd).

6. The display panel of claim 1, wherein a working process of the display panel comprises a first mode and a second mode;

wherein in the first mode, the non-light-emission stage is a first non-light-emission stage, wherein a duration of the first non-light-emission stage is S11; and in the second mode, the non-light-emission stage is a second non-light-emission stage, wherein a duration of the second non-light-emission stage is S22;

wherein S11>S22.

7. The display panel of claim 6, wherein in the first non-light-emission stage, the duration of the time period between the turn-off of the second light emission control module and the start of the first preset stage is L11, and the duration of the first preset stage is W11; and in the second non-light-emission stage, the duration of the time period between the turn-off of the second light emission control module and the start of the first preset stage is L21, and the duration of the first preset stage is W21;

wherein L11>L21.

8. The display panel of claim 7, wherein

L11>W11, and L21<W21; or,

L11>W11, and L21>W21.

9. The display panel of claim 8, wherein

L11>W11, and L21<W21; and (L11−W11)>(W21−L21).

10. The display panel of claim 6, wherein in the first non-light-emission stage, a duration of a time period between an end of a last preset stage of the at least one preset stage and turn-on of the second light emission control module is L1*n*, and a duration of the last preset stage is W1*n*; and in the second non-light-emission stage, the duration of the time period between the end of the last preset stage and the turn-on of the second light emission control module is L2*n*, and the duration of the last preset stage is W2*n*;

wherein L1*n*≥L2*n*.

11. The display panel of claim 10, wherein

L1*n*>W1*n*, and L2*n*<W2*n*; or,

L1*n*>W1*n*, and L2*n*>W2*n*.

12. The display panel of claim 8, wherein

L1*n*>W1*n*, and L2*n*<W2*n*; and (L1*n*−W1*n*)>(W2*n*−L2*n*).

13. The display panel of claim 6, wherein the working process of the display panel comprises a first time period and a second time period, wherein the first time period and the second time period are different time periods;

wherein in the first time period, the pixel circuit works in the first mode; and in the second time period, the pixel circuit works in the second mode.

14. The display panel of claim 6, wherein the display panel comprises a first pixel circuit and a second pixel circuit;

wherein in at least part of a time period of the working process of the display panel, the first pixel circuit works in the first mode, and the second pixel circuit works in the second mode.

15. The display panel of claim 14, wherein a data refresh rate of the first pixel circuit is Fs1, and a data refresh rate of the second pixel circuit is Fs2, wherein Fs1≠Fs2.

16. A display device, comprising the display panel according to claim 1.

17. A display panel, comprising:

a pixel circuit and a light-emitting element;

wherein the pixel circuit comprises a drive module, a light emission control module, and a compensation module;

the drive module comprises a drive transistor, wherein the drive transistor comprises a gate, a first electrode, and a second electrode;

the light emission control module comprises a first light emission control module and a second light emission control module, wherein the first light emission control module is connected between a first power signal line and the drive transistor, and the second light emission control module is connected between the drive transistor and the light-emitting element;

the compensation module is connected between the gate and the second electrode of the drive transistor, and a time period during which the compensation module is on is a preset stage;

wherein a working process of the pixel circuit comprises a non-light-emission stage and a light emission stage, and the non-light-emission stage comprises at least one preset stage;

in the light emission stage, the first light emission control module and the second light emission control module are turned on;

in the non-light-emission stage, at least the second light emission control module is turned off;

wherein the display panel satisfies at least one of:

in the non-light-emission stage, a duration of a time period between a turn-off of the second light emission control module and a start of a first preset stage of the at least one preset stage is L1, and a duration of the first preset stage is W1, wherein L1>W1; or, in the non-light-emission stage, a duration of a time period between an end of a last preset stage of the at least one preset stage and turn-on of the second light emission control module is Ln, and a duration of the last preset stage is Wn, wherein Ln>Wn;

wherein a working process of the display panel comprises a first mode and a second mode;

wherein in the first mode, the non-light-emission stage is a first non-light-emission stage, wherein a duration of the first non-light-emission stage is S11; and in the second mode, the non-light-emission stage is a second non-light-emission stage, wherein a duration of the second non-light-emission stage is S22;

wherein S11>S22;

wherein in the first non-light-emission stage, the duration of the time period between the turn-off of the second light emission control module and the start of the first preset stage is L11, and the duration of the first preset stage is W11; and in the second non-light-emission stage, the duration of the time period between the turn-off of the second light emission control module and the start of the first preset stage is L21, and the duration of the first preset stage is W21; and wherein L11>L21.

18. A display device, comprising the display panel according to claim 17.

19. A display panel, comprising:

a pixel circuit and a light-emitting element;

wherein the pixel circuit comprises a drive module, a light emission control module, and a compensation module;

the drive module comprises a drive transistor, wherein the drive transistor comprises a gate, a first electrode, and a second electrode;

the light emission control module comprises a first light emission control module and a second light emission control module, wherein the first light emission control module is connected between a first power signal line and the drive transistor, and the second light emission control module is connected between the drive transistor and the light-emitting element;

the compensation module is connected between the gate and the second electrode of the drive transistor, and a time period during which the compensation module is on is a preset stage;

wherein a working process of the pixel circuit comprises a non-light-emission stage and a light emission stage, and the non-light-emission stage comprises at least one preset stage;

in the light emission stage, the first light emission control module and the second light emission control module are turned on;

in the non-light-emission stage, at least the second light emission control module is turned off;

wherein the display panel satisfies at least one of:

in the non-light-emission stage, a duration of a time period between a turn-off of the second light emission control module and a start of a first preset stage of the at least one preset stage is L1, and a duration of the first preset stage is W1, wherein L1>W1; or, in the non-light-emission stage, a duration of a time period between an end of a last preset stage of the at least one preset stage and turn-on of the second light emission control module is Ln, and a duration of the last preset stage is Wn, wherein Ln>Wn;

wherein a working process of the display panel comprises a first mode and a second mode;

wherein in the first mode, the non-light-emission stage is a first non-light-emission stage, wherein a duration of the first non-light-emission stage is S11; and in the second mode, the non-light-emission stage is a second non-light-emission stage, wherein a duration of the second non-light-emission stage is S22;

wherein in the first non-light-emission stage, a duration of a time period between an end of a last preset stage of the at least one preset stage and turn-on of the second light emission control module is L1*n*, and a duration of the last preset stage is W1*n*; and in the second non-light-emission stage, the duration of the time period between the end of the last preset stage and the turn-on of the second light emission control module is L2*n*, and the duration of the last preset stage is W2*n*; and wherein L1*n*≥L2*n*.

20. A display device, comprising the display panel according to claim 19.

* * * * *